(12) United States Patent
   Bedford

(10) Patent No.: US 12,663,088 B2
(45) Date of Patent: Jun. 23, 2026

(54) FLUID VALVE

(71) Applicant: WATH GROUP LIMITED, Rotherham (GB)

(72) Inventor: William Bedford, Rotherham (GB)

(73) Assignee: WATH GROUP LIMITED, Rotherham (GB)

( * ) Notice: Subject to any disclaimer, the term of this patent is extended or adjusted under 35 U.S.C. 154(b) by 119 days.

(21) Appl. No.: 18/684,164

(22) PCT Filed: Aug. 16, 2022

(86) PCT No.: PCT/GB2022/052127
   § 371 (c)(1),
   (2) Date: Feb. 15, 2024

(87) PCT Pub. No.: WO2023/021281
   PCT Pub. Date: Feb. 23, 2023

(65) Prior Publication Data
   US 2024/0360904 A1      Oct. 31, 2024

(30) Foreign Application Priority Data

Aug. 16, 2021   (GB) ...................................... 2111743
   Feb. 17, 2022   (GB) ...................................... 2202158

(51) Int. Cl.
   *F16K 3/24*          (2006.01)
   *F16K 3/02*          (2006.01)
   (Continued)

(52) U.S. Cl.
   CPC ............ *F16K 3/243* (2013.01); *F16K 3/0254* (2013.01); *F16K 3/0272* (2013.01); *F16K 3/314* (2013.01);
   (Continued)

(58) Field of Classification Search
   CPC ...... F16K 3/243; F16K 3/0254; F16K 3/0272; F16K 3/314; F16K 27/041; F16K 31/508;
   (Continued)

(56) References Cited

U.S. PATENT DOCUMENTS 5,186,199 A       2/1993  Murphy et al.
   6,357,471 B1 *    3/2002  Sato ...................... F16L 55/105
                                                          408/199

(Continued)

OTHER PUBLICATIONS

International Search Report and Written Opinion received in PCT/GB2022/052127 mailed Oct. 5, 2022, 11 pages.

*Primary Examiner* — John Bastianelli
(74) *Attorney, Agent, or Firm* — Meunier Carlin & Curfman LLC

(57)          ABSTRACT

A valve cartridge (11) for a live insertion valve (10) for a pipe (102) is provided, the valve cartridge (11) comprising a valve member (14), wherein the valve cartridge (11) is configured such that, in use, the valve member (14) is moveable between an inactive state in which the valve member (14) permits a flow of fluid through a pipe (102), and an active state in which the valve member (14) blocks a flow of fluid through a pipe (102). The valve member (14) comprises a first seal (18) and a second seal (20), wherein the valve cartridge (11) is configured such that, in use, the first seal (18) is arranged to block a flow of fluid along said pipe (102) and the second seal (20) is arranged to block a flow of fluid in a direction transverse to said pipe (102) when the valve member (14) is in the active state. The second seal (20) is at least partially seated on the first seal (18) or vice versa. The valve cartridge (11) provides effective scaling of the pipe (102).

7 Claims, 23 Drawing Sheets

(51) Int. Cl.

| | |
|---|---|
| *F16K 3/314* | (2006.01) |
| *F16K 27/04* | (2006.01) |
| *F16K 31/50* | (2006.01) |
| *F16L 55/105* | (2006.01) |

(52) U.S. Cl.
CPC .......... *F16K 27/041* (2013.01); *F16K 31/508* (2013.01); *F16L 55/105* (2013.01); *F16K 2200/501* (2021.08)

(58) Field of Classification Search
CPC .... F16K 2200/501; F16K 3/0281; F16K 7/20; F16K 27/04; F16L 55/105
USPC ................................................. 251/326–329
See application file for complete search history.

(56) References Cited

U.S. PATENT DOCUMENTS

| | | | | |
|---|---|---|---|---|
| 6,810,903 B1 * | 11/2004 | Murphy | ............... | F16L 55/124 |
| | | | | 29/213.1 |
| 2013/0193356 A1 | 8/2013 | Collison et al. | | |
| 2013/0319542 A1 | 12/2013 | Ries | | |
| 2015/0247578 A1 | 9/2015 | Vazzana et al. | | |
| 2019/0186640 A1 | 6/2019 | Vazzana et al. | | |
| 2019/0316723 A1 | 10/2019 | Nelson et al. | | |

* cited by examiner

Fig. 7

| Pipe Diameter | Number of Required Turns |
|---|---|
| 3″ (7.62 cm) | 8.5 |
| 4″ (10.16 cm) | 10.5 |
| 5″ (12.7 cm) | 12.5 |
| 6″ (15.24 cm) | 15.5 |
| 7″ (17.78 cm) | 16 |
| 8″ (20.32 cm) | 17 |
| 9″ (22.86 cm) | 19.5 |
| 10″ (25.4 cm) | 21 |
| 12″ (30.48 cm) | 25 |

FLUID VALVE

FIELD

The present disclosure relates to a valve cartridge for a live insertion valve for a pipe, a kit of parts including said valve cartridge and a casing for attachment to a pipe, and a live insertion valve assembly including said valve cartridge and said casing.

BACKGROUND

There is sometimes a need to block a flow along a pipe in a fluid distribution network, such as a water mains distribution network, e.g. in order to carry out maintenance or repair. Various valves exist which are intended for this purpose.

Live insertion valves are a particular type of valve used in water distribution networks. Live insertion valves can be installed under live pressure and thus require no shutdown of the fluid network. This makes live insertion valves suitable for emergency repairs, as well as other applications.

Commonly, a casing is provided including a first portion, which surrounds a pipe to which the valve is to be fitted, and a second portion extending from the first portion in a direction transverse to the pipe. An opening in a side wall of a pipe is created in line with the second portion of the valve casing such that a live insertion valve cartridge can be installed via the second portion of the casing. In such applications, the live insertion valve cartridge typically includes a valve member which is introduced to the pipe via the second portion of the casing and through the opening in the side wall of the pipe. The valve member is arranged to move between an inactive state, in which fluid is permitted to flow along the pipe, and an active state, in which fluid is blocked from flowing along the pipe.

One issue with such known live insertion valve systems is that there is often leakage around the valve member when it is in the active state. In other words, while flow along the pipe may be generally inhibited by the valve member in the active state, it is difficult to block this flow entirely.

A leadscrew mechanism consisting of a leadscrew and a lead nut coupled to a body of the valve member is a known means for moving the valve member. It is known to secure the lead nut to the body via fasteners (e.g. bolts) which are screwed through the lead nut into threads in the body of the valve member.

The present disclosure aims to overcome or at least mitigate one or more problems associated with the prior art.

SUMMARY

According to a first aspect of the disclosure, a valve cartridge for a live insertion valve for a pipe is provided, the valve cartridge comprising a valve member, wherein the valve cartridge is configured such that, in use, the valve member is moveable between an inactive state in which the valve member permits a flow of fluid through a pipe, and an active state in which the valve member blocks a flow of fluid through a pipe.

Optionally, the valve member comprises a body.

Optionally, the valve member comprises a first seal and a second seal, wherein the valve cartridge is configured such that, in use, the first seal is arranged to block a flow of fluid along said pipe and the second seal is arranged to block a flow of fluid in a direction transverse to said pipe when the valve member is in the active state.

Optionally, the second seal is at least partially seated on the first seal, and/or the first seal is at least partially seated on the second seal.

It will be understood that when a valve member blocks a flow of fluid through a pipe, pressure will build upstream of the valve member which may then urge fluid in a transverse direction to the pipe (e.g. through a transverse channel associated with the valve cartridge or a transverse pipe of a pipe arrangement). Flow of fluid in said transverse direction is blocked by the second seal on the valve member, thereby inhibiting leakage in a transverse direction.

The second seal being at least partially seated on the first seal and/or vice versa acts to prevent or inhibit a leak path forming between the first and second seals. Accordingly, improved sealing performance is achieved.

In exemplary embodiments, the second seal is at least partially seated on the first seal.

Optionally, the first seal is at least partially seated on the second seal (e.g. at a first side of the valve member) and the second seal is at least partially seated on the first seal (e.g. at an opposing second side of the valve member).

Optionally, the valve member is configured so that, in use, the first seal is compressible towards the second seal when the valve member is in the active state.

The first seal being compressed towards the second seal improves the contact between the seals, which inhibits generation of a leak path and hence improves seal performance.

Optionally, the first seal and/or the second seal is formed of a compressible material.

The first and/or second seals being formed of compressible material allows the seals to adapt to the shape of each other and/or to the shape of the pipe and/or to the shape of a casing associated with the valve cartridge, which improves seal performance.

Optionally, the first seal is a gate seal which is configured to extend in a first plane such that, when in use, the first plane extends perpendicular to a longitudinal axis of a pipe; optionally, wherein the gate seal is a U-shaped gate seal.

Such a seal has been found to provide effective seal performance in applications such as live stopping of flows in water distribution networks.

Optionally, the second seal is arranged to act along a second plane which is transverse to the first plane (e.g. perpendicular), optionally wherein the second seal is an annular seal, optionally an O-ring.

Such an annular seal can inhibit leakage around an entire circumference of a transverse channel or secondary pipe of a pipe arrangement associated with the valve cartridge. An O-ring has been found to be particularly effective for providing circumferential sealing.

Optionally, the first seal comprises first and second seat portions on opposing sides of the valve member, and wherein the second seal is seated on the first and second seat portions.

Optionally, the second seal comprises first and second seat portions on opposing sides of the valve member, and wherein the first seal is seated on the first and second seat portions.

Optionally, the first seal comprises a first seat portion on a first side of the valve member and the second seal comprises a second seat portion on an opposing second side of the valve member, wherein the first seal is seated on the second seat portion and the second seal is seated on the first seat portion.

Such seat portions ensure the first and second seals contact each other, which inhibits a leak path between the first and second seals.

Optionally, each of said seat portions in the first seal has a seat profile which conforms to a profile of a corresponding portion of the second seal.

Optionally, each of said seat portions in the second seal has a seat profile which conforms to a profile of a corresponding portion of the first seal.

Such seat profiles increase the contact area between the first and second seals, which improves sealing performance and inhibits a leak path between the first and second seals.

Optionally, the second seal comprises curved cross-sectional profile (e.g. the second seal comprises an O-ring) and each seat portion in the first seal defines a curve or arc in cross-section which conforms to a cross-sectional profile of the second seal.

Having a curved or arced seat portion which conforms to a cross-sectional curved (e.g. circular) profile of the second seal (e.g. O-ring) results in the seat portion partially extending around the cross-sectional curved profile of the second seal. This improves sealing performance and inhibits a leak path between the first and second seals.

Optionally, the second seal comprises an annular seal and wherein each seat portion in the first seal is curved in a circumferential direction of the second seal to conform to a circumference (e.g. inner circumference) of the second seal.

Having a seat portion which conforms to a circumference of the annular second seal increases the contact area between the seat portion and the second seal in a circumferential direction. In other words, the annular second seal extends closely around the seat portions in a circumferential direction. This improves sealing performance and inhibits a leak path between the first and second seals.

Optionally, the first seal is a compressible seal comprising one or more deformation reliefs configured to permit asymmetrical deformation of the seal.

Such deformation reliefs improve sealing performance in pipes with internal profiles which are irregular and/or uneven and/or non-circular, because the first seal can be compressed asymmetrically in use to conform to the irregular/uneven/non-circular surface of the pipe.

Optionally, the first seal has an inner edge and an outer edge and each of the one or more deformation reliefs comprises a recess or cut-out on the inner edge.

Such a seal configuration has been found to facilitate effective asymmetrical deformation in use.

Optionally, the first seal comprises a series of deformation reliefs along the inner edge.

Such a seal configuration has been found to facilitate effective asymmetrical deformation in use.

Optionally, the valve cartridge comprises an actuation mechanism for moving the valve member such that, in use, the actuation mechanism is configured to move the valve member between the active and inactive states.

Optionally, the actuation mechanism is configured to move the valve member linearly such that, in use, the valve member is moveable in a direction transverse to a pipe, in order to move between the active and inactive states.

Such a linear movement has been found to be an effective way of stopping flow through a pipe (e.g. a flow of water in a live water distribution pipe). Furthermore, linear actuation facilitates compression of seals (e.g. the first seal against a wall of the pipe and against the second seal) which improves seal performance.

Optionally, the actuation mechanism comprises a rotatable member, wherein rotation of the rotatable member in a first direction causes linear movement of the valve member in a first direction, and rotation of the rotatable member in a second direction causes linear movement of the valve member in the opposite direction.

Having such a rotatable member allows standard rotational tools (e.g. allen keys, spanners, screw drivers and the like) to be used to actuate the valve member.

Optionally, the valve cartridge comprises a fixed portion for locating the valve cartridge in position when in use, and wherein the actuation mechanism is configured to move the valve member relative to the fixed portion.

Such a fixed portion facilitates correct positioning of the valve within a pipe arrangement.

Optionally, the fixed portion comprises a third seal, wherein the valve cartridge is configured such that, in use, the third seal is arranged to seal the fixed portion against a second pipe or a casing of a pipe arrangement.

Such a third seal inhibits fluid travelling around the fixed part (e.g. if fluid manages to bypass the second seal of the valve member, the third seal provides a redundant seal).

Optionally, the valve cartridge further comprises an anti-rotation arrangement configured such that, in use, the anti-rotation arrangement is arranged to inhibit rotation of the valve member relative to a pipe.

Such an anti-rotation arrangement improves sealing by preventing rotation which could lead to gaps forming between the valve member and an associated pipe. Fixing the valve member rotationally also allows linear actuator mechanisms, such as leadscrew mechanisms or ballscrew mechanisms, to be used to move the valve member in a linear direction.

Optionally, the anti-rotation arrangement comprises one or more projections, optionally a pair of spaced apart rods, configured to be fixed relative to a pipe when in use, and a corresponding one or more channels in the valve member for receiving the projections.

Such an anti-rotation arrangement has been found to provide an effective means for preventing rotation of the valve member. Furthermore, such an anti-rotation arrangement does not require a pipe or casing in which the valve member is moved through to be specially adapted to prevent rotation.

Optionally, the actuation mechanism comprises a screw and a corresponding receiver (e.g. nut) in the valve member, wherein the receiver comprises an axial bore for receiving the screw, and wherein the screw and receiver are configured to co-operate such that the receiver moves linearly along the screw when the screw rotates relative to the receiver.

Optionally, the receiver is coupled to a socket of the body. Optionally, the receiver is coupled to the socket of the body via one or more securing elements (e.g. fasteners).

The receiver being coupled to a socket in the body of the valve member (e.g. as opposed to being integrally formed with the body of the valve member) allows different materials to be used for the body and the receiver. For example, a comparatively lighter, cheaper and/or softer material can be used for the body (e.g. a plastics material) while a comparatively heavier, more expensive and/or harder material can be used for the receiver (e.g. a metallic material).

Optionally, the screw is a leadscrew and the receiver is a lead nut, wherein the leadscrew and axial bore of the lead nut comprise complementary threads.

It will be understood that, because the anti-rotation arrangement inhibits rotation of the valve member relative to a pipe when in use, the complementary threads will cause the valve member to move linearly when the leadscrew is rotated. In this way, the valve member can transition between the inactive and active states by rotation of the leadscrew.

A leadscrew mechanism of this kind is relatively cheap and reliable and has a small number of moving parts (e.g in comparison to a ball screw or roller screw mechanism).

Optionally, the actuation mechanism comprises a ball screw mechanism.

Optionally, the actuation mechanism comprises a roller screw mechanism.

Optionally, the socket defines a first surface (e.g. shoulder) for abutment with the receiver, wherein the body of the valve member comprises one or more second surfaces (e.g. shoulders) for abutment with one or more support elements, and wherein the valve member further comprises a clamping arrangement configured to urge the receiver and one or more support elements towards the respective first and second surfaces to clamp the receiver to the body.

In prior art systems, a leadscrew mechanism consisting of a leadscrew and a lead nut coupled to a body of the valve member are arranged to move the valve member. It is known to secure the lead nut to the body via fasteners (e.g. bolts) which are screwed through the lead nut into threads in the body of the valve member, the body typically being made from a plastics material. A problem with this means for fastening the lead nut to the body of the valve member is that threads of the body shear more easily than threads of stronger materials such as metallic materials. This can result in disengagement of the lead nut from the body when a large separation force is applied.

The disclosed clamping arrangement being configured to urge the receiver and one or more support elements towards the respective first and second surfaces to clamp the receiver to the body results in a more robust connection than when the receiver is secured to the body via fasteners which pass through the receiver and are held by threads in the body. The clamping arrangement is particularly beneficial when the body is made of comparatively soft material (e.g. plastics material) which is unsuitable for receiving threaded fasteners subjected to high shear forces.

Optionally, the first surface extends radially and/or the second surface extends radially. Optionally, the first and second surfaces each extend radially and face in opposite axial directions.

Optionally, the clamping arrangement comprises one or more connecting elements for coupling the receiver to the one or more support elements.

Optionally, the one or more connecting elements are provided to extend between the receiver and the or each support element.

Optionally, the one or more connecting elements extend in a corresponding one or more axial through-holes of the body between the first and second surfaces.

The connecting element(s) extending through corresponding axial through-holes in the body provides resistance to lateral movement of the connecting element(s) relative to the body, which thus inhibits lateral movement and/or rotation of the receiver and the or each support element relative to the body.

Optionally, the one or more connecting elements extend at least partially into a corresponding one or more axial holes of the receiver;

Optionally, the or each connecting element comprises a shaft of a fastener comprising a thread and the or each axial hole of the receiver comprises a complementary thread for coupling the shaft to the receiver.

In this way, as a connecting element is rotated within the axial hole of the receiver, the complementary threads cause the receiver to move linearly (i.e. towards the first surface).

Optionally, the one or more support elements and one or more connecting elements are discrete components.

Optionally, the or each support element is integrally formed with a connecting element, optionally, wherein the or each support element comprises a head of a fastener and the respective connecting element comprises a shaft of the fastener.

Optionally, the one or more connecting elements extend at least partially into a corresponding one or more axial holes of the one or more support elements; optionally, wherein the one or more support elements comprise a support element comprising two or more axial holes for at least partly receiving two or more respective connecting elements.

Such a support element can be used to distribute a force applied by the two or more connecting elements over the entire area of the support element (i.e. including the area between the two connecting elements) which increases the area of contact with the second surface.

Optionally, the axial holes of the one or more support elements are through-holes, wherein the or each connecting element is a fastener comprising a shaft configured to extend through a respective through-hole of the one or more support elements and a head configured to push a respective support element towards the second surface.

Optionally, the socket comprises a first formation and the receiver comprises a second formation configured to engage the first formation to inhibit relative rotation between the receiver and the body.

Such first and second formations inhibit rotation of the receiver within the socket, which facilitates effective functioning of the actuation mechanism.

Furthermore, where axial fasteners are used to secure the receiver to the body, such fasteners experience a shear force when the receiver is urged rotationally relative to the socket. Therefore, the first and second formations reduces such shear forces and facilitate a more robust connection between the receiver and the socket.

Optionally, the first formation comprises an inner wall of the socket, and wherein the second formation comprises a periphery of the receiver configured to engage the inner wall of the socket.

Optionally, the inner wall of the socket comprises a multifaceted inner wall, e.g. a square, hexagonal or other polygonal shape in plan view, and the periphery of the receiver defines a corresponding multifaceted periphery, e.g. square, hexagonal or other polygonal shape in plan view.

Such an inner wall and periphery provides a simple means for inhibiting relative rotation between the receiver and the socket.

Optionally, the receiver comprises a periphery having a radial recess (e.g. radial groove and/or radial bore), and wherein the body of the valve member comprises a radial channel aligned with the radial recess, such that a securing element can be received within the channel of the body and the radial recess of the receiver to inhibit movement of the receiver relative to the body, optionally, to inhibit axial and/or rotational movement.

Such an arrangement provides a means for inhibiting movement between the receiver and the body which can be used in addition to, or instead of, other securing means such as axial fasteners or a clamping arrangement.

Optionally, the body of the valve member comprises a plurality of radial channels and the receiver comprises a plurality of corresponding radial recesses for receiving a corresponding plurality of securing elements; optionally, wherein the plurality of radial channels are distributed circumferentially around the body and the plurality of radial recesses are distributed circumferentially around the receiver.

Having a plurality of such radial channels/recesses for receiving a plurality of securing elements, further increases the robustness of the connection between the receiver and the socket.

Optionally, the or each radial recess is threaded for receiving a threaded securing element, and/or each radial channel is threaded for receiving a threaded securing element.

Such threads provide a means for securing the securing elements in place to provide a robust connection between the receiver and the socket.

Optionally, the body comprises a first body portion releasably coupled to a second body portion.

Having a first body portion releasably coupled to a second body portion allows the valve member to be disassembled for maintenance or repair. In addition, the first body portion may be configured to fit within a valve casing of a certain diameter and the second body portion may be replaceable with other second body portions of different size to fit different pipe diameters. In this way, the valve cartridge can be reconfigured by replacement of the second body part (and any associated seals) without having to replace the entire valve cartridge.

Optionally, the first body portion comprises the first and second surfaces, and wherein the second surface and one or more support elements are covered by the second body portion, when assembled.

In this way, the side of the clamping arrangement opposite the socket (i.e. the side embedded within the body) can be accessed for tightening/loosening of the clamping arrangement, e.g. for repair or maintenance.

Optionally, the body of the valve member is made of a plastics material, optionally of a thermoplastics material, optionally of an acetal material, and wherein the receiver is made of a comparatively harder material, e.g. a metal material, optionally of naval brass or high tensile brass.

Such plastics materials are suitable for the body of the valve member because they are relatively cheap and lightweight compared to metallic materials.

A receiver made from a comparatively harder material facilitates effective functioning of the actuation mechanism (since the harder material is harder wearing and withstands greater forces applied during actuation of the actuation mechanism).

Optionally, the receiver projects axially beyond the valve body.

In this way, if the actuation mechanism is over-actuated when retracting the valve member towards a fixed portion of the valve cartridge, the receiver contacts the fixed portion before the body does. Therefore, any abutment force which bears down on top of the valve member is absorbed by the receiver (which is typically made of comparatively hard material such as metallic material).

Optionally, the valve member comprises one or more seals, optionally compressible seals, for inhibiting leakage around the valve member when the valve member is in the active state in use.

Such seals facilitate effective functioning of the valve member.

Optionally, the valve cartridge comprises a fixed portion for locating the valve cartridge in position when in use, and wherein the actuation mechanism is configured to move the valve member relative to the fixed portion.

Optionally, the screw is coupled to the fixed portion, wherein the valve cartridge further comprises a thrust bearing provided between the fixed portion and the screw.

Such a thrust bearing facilitates easy rotation of the screw (e.g. using unpowered hand tools).

Optionally, the screw is coupled to the fixed portion, wherein the valve cartridge further comprises a sealing arrangement between the screw and the fixed portion.

Such a sealing arrangement inhibits fluid travelling along the leadscrew and through the fixed part.

Optionally, the fixed portion comprises one or more radial recesses (e.g. radial groove(s) and/or radial bore(s)) for receiving one or more securing elements extending from a valve casing to inhibit movement of the fixed portion relative to said casing, optionally, to inhibit axial and/or rotational movement.

Optionally, the valve cartridge comprises an actuation mechanism having a rotatable member, wherein rotation of the rotatable member in a first direction causes the valve member to move in a first linear direction and rotation of the rotatable member in the second direction causes the valve member to move in a second linear direction opposite the first direction, and wherein the valve cartridge is configured such that, in use in a pipe of a predetermined diameter, the number of turns of the rotatable member required to move the valve member from the active state to the inactive state and vice versa is a predetermined number of turns dependent on the predetermined diameter.

Having an industry standard number of turns allows an experienced operator to know when the live insertion valve associated with the valve cartridge has been fully opened/closed based on the number of turns applied to the rotatable member.

Optionally, the screw is coupled to a thrust bearing arrangement which is configured to facilitate rotation of the screw, e.g. to reduce the amount of force needed to rotate the screw.

Such a thrust bearing facilitates easy rotation of the screw (e.g. using unpowered hand tools). In particular, such a thrust bearing facilitates rotation of the screw when the screw is subjected to axial forces (e.g. upward or downward axial forces) that would otherwise act to inhibit rotation of the screw.

Optionally, the thrust bearing arrangement comprises a first thrust bearing located between the screw and the or a fixed portion of the valve cartridge.

Optionally, the first thrust bearing comprises a first bearing component coupled to the screw and a second bearing component coupled to the fixed portion, wherein the first and second bearing components are configured to rotate relative to each other to facilitate rotation between the screw and the fixed portion e.g. when the screw is subjected to downwards and/or upwards axial force.

Optionally, the first thrust bearing is a lubricated thrust bearing.

According to a further aspect of the disclosure, a valve arrangement for a live insertion valve for a pipe is provided, the valve arrangement comprising a valve cartridge as disclosed herein, and a fixed component for at least partly covering the valve cartridge when the valve cartridge is located in a pipe in use, wherein the valve cartridge comprises a screw coupled to a thrust bearing arrangement which is configured to facilitate rotation of the screw, and wherein the thrust bearing arrangement comprises a second thrust bearing located between the screw and the fixed component.

Optionally, the fixed component comprises a cover plate.

Optionally, the second thrust bearing comprises a first bearing component coupled to the screw and a second bearing component coupled to the fixed component, wherein the first and second bearing components are configured to rotate relative to each other to facilitate rotation between the screw and the fixed component when the screw is subjected to upwards and/or downwards axial force.

Optionally, the second thrust bearing is a lubricated thrust bearing.

Optionally, the thrust bearing arrangement is sealed by a sealing arrangement.

According to a further aspect of the invention, a kit of parts for a live insertion valve for a pipe is provided, the kit of parts comprising a valve cartridge as disclosed herein, and a cover plate for covering the valve cartridge when the valve cartridge is located in a pipe in use.

Optionally, wherein the fixed portion and/or the cover plate comprises one or more axial bores configured to engage with one or more corresponding axial elements aligned with the axial bores, to inhibit relative rotation between the fixed portion and the cover; optionally, wherein the one or more axial elements comprise one or more pins or fasteners which are received within axial bores of both the fixed portion and the cover plate; optionally wherein the one or more axial elements comprise projections integrally formed with the fixed portion and/or cover plate.

Optionally, the kit of parts further comprises a casing for coupling to a pipe, wherein the casing comprises a cylindrical channel configured to receive at least part of the valve cartridge and wherein the casing is arranged such that, when in use and coupled to a pipe, the cylindrical channel extends in a direction transverse to said pipe.

Optionally, the casing comprises one or more radial channels configured to align with the one or more radial recesses of the fixed portion of the valve cartridge, such that one or more securing elements can be received within the channel(s) of the casing and within the radial recess(es) of the fixed portion to inhibit movement of the fixed portion relative to the casing, optionally, to inhibit axial and/or rotational movement.

According to a further aspect of the invention, a kit of parts for a live insertion valve for a pipe is provided, the kit of parts comprising:

a valve cartridge as disclosed herein; and a casing for coupling to a pipe;

wherein the casing comprises a cylindrical channel configured to receive at least part of the valve cartridge and wherein the casing is arranged such that, when in use and coupled to a pipe, the cylindrical channel extends in a direction transverse to said pipe.

Such a kit of parts allows the valve cartridge to deployed in pipe arrangements where no pre-existing transverse casing or secondary pipe are present (i.e. by coupling the casing to the pipe and then positioning the valve cartridge within the pipe).

Optionally, the casing comprises an opening at an end of the cylindrical channel, wherein the valve cartridge is configured for deployment through the opening.

Optionally, the casing comprises a detachable cover for the opening at the end of the cylindrical channel.

Such a cover allows the casing to be closed once the valve cartridge has been deployed. This inhibits ingress of dirt/debris or damage to the valve cartridge.

Optionally, the casing comprises a flange at an end of the cylindrical channel, wherein the cover is configured for attachment to the flange.

This provides a simple means of attaching a cover to the casing.

Optionally, the casing comprises a saddle portion for securing around the circumference of a pipe, and a channel body extending from the saddle portion, wherein the cylindrical channel is defined by the channel body.

Optionally, the casing is arranged to cover an opening in a side wall of a pipe such that the channel body surrounds said opening.

Optionally, the saddle portion comprises a two-part structure for attachment around the circumference of a pre-existing pipe.

Optionally, the casing comprises an upper saddle portion configured to fit over an upper portion of a pipe circumference and a lower saddle portion configured to fit over a lower portion of a pipe circumference.

Such a two-part structure allows the casing to be fitted at a desired portion of a pre-existing pipe without having to be slid over an end of the pipe, which may not be accessible in applications such as underground water distribution pipes.

Optionally, the channel body is integrally formed with the upper saddle portion.

According to a further aspect of the invention a live insertion valve assembly is provided, the live insertion valve assembly comprising:

a pipe comprising a side wall having a pipe opening;

a casing comprising a cylindrical channel configured to surround the opening and to extend in a direction transverse to the pipe; and a valve cartridge as disclosed herein, wherein the valve cartridge is configured to be at least partially located within the cylindrical channel.

BRIEF DESCRIPTION OF FIGURES

Embodiments of the disclosure will now be described, by way of example only, with reference to the following figures, in which:

FIG. 7 shows the live insertion valve assembly of FIG. 6, with the valve in the active state;

FIG. 8 is a table of the number of turns required to move the valves of FIGS. 1 to 7 between inactive and active states for different pipe diameters;

FIGS. 11*a* and 11*b* are sectional views of the valve cartridge of FIGS. 9*a* to 10 taken along line A-A in inactive and active states respectively;

FIG. 14 is a sectional view of the valve cartridge of FIGS. 9*a* to 13 taken along line C-C;

Figure 18:
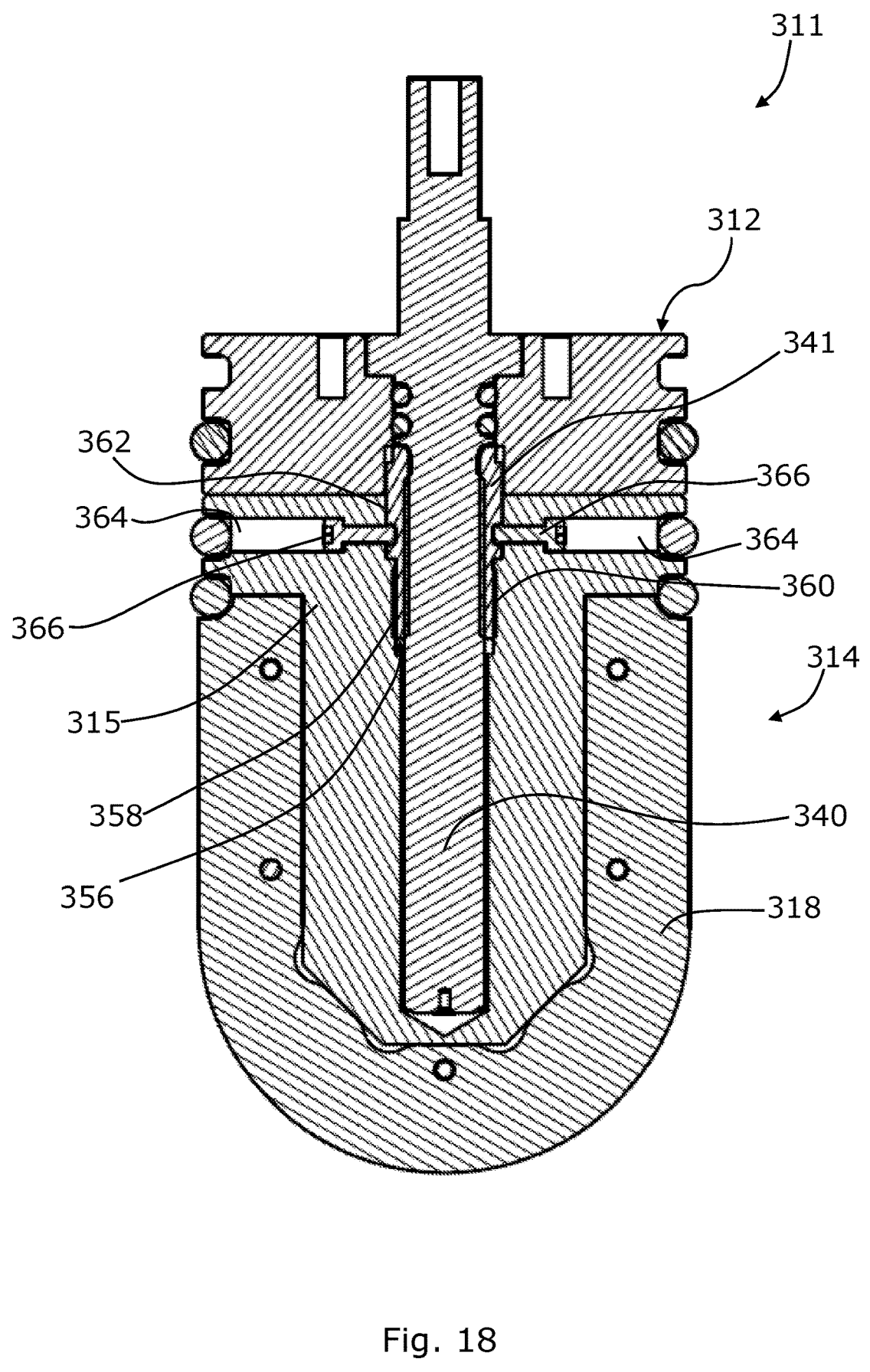

FIG. 18 is a side sectional view of a valve cartridge according to a further embodiment;

DETAILED DESCRIPTION

Figure 1:
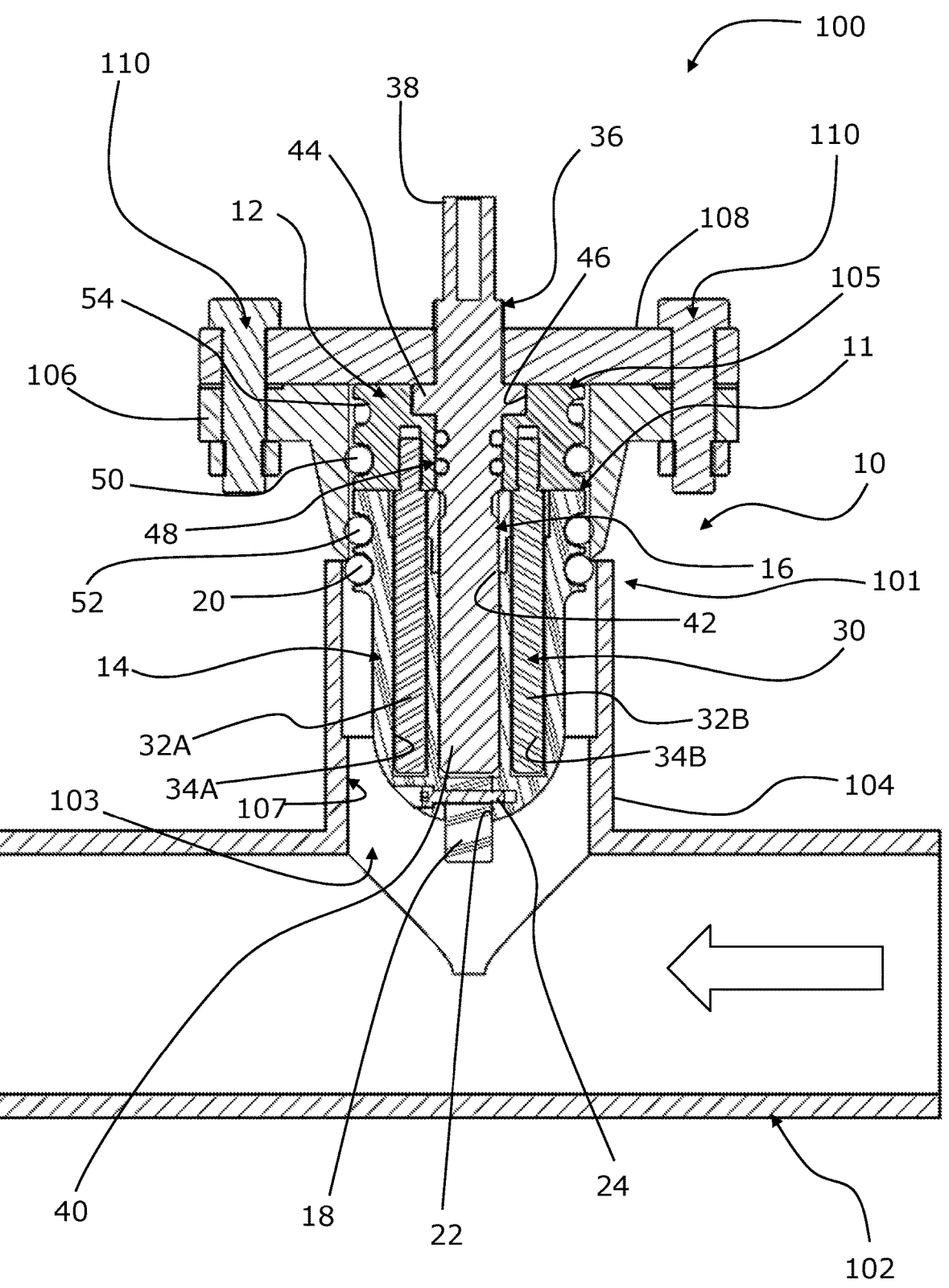
FIG. 1 depicts a live insertion valve assembly according to an embodiment disclosed herein, when the valve is in an inactive state, shown in cross-section along a longitudinal axis of the pipe.

Referring to FIGS. 1 to 5, a live insertion valve assembly is indicated generally at 100. The live insertion valve assembly 100 includes a section of a pipe 102 and a valve 10 coupled to the pipe 102.

In the illustrated embodiment, the pipe 102 is part of a water distribution network and the valve 10 is a live insertion valve. It will be appreciated that the valve 10 may be installed in a pipe of any type of fluid flow network.

The live insertion valve assembly 100 includes a casing 101 coupled to the pipe 102. The valve 10 includes a valve cartridge 11 arranged to be located in the casing 101 such that the valve cartridge 11 is configured to move between an active state, in which fluid is permitted to flow along the pipe 102, and an active state, in which fluid is blocked from flowing along the pipe 102.

The casing 101 includes a channel body 104 which is arranged transverse to the pipe 102 and in line with an opening 103 in a side wall of the pipe 102. As shown in the figures, the channel body 104 surrounds the opening 103. In some embodiments, the channel body 104 and the opening 103 are coaxial.

The casing 101 also includes a flange portion 106 coupled to the channel body 104 (e.g. integrally formed with the channel body 104), which defines an opening 105. As can be seen in the figures, the opening 105 is provided at an end of the casing 101 distal the pipe 102. The valve cartridge 11 is configured for deployment through the opening 105.

The channel body 104 and the flange portion 106 together define a cylindrical channel 107 in which the valve cartridge 11 is located.

The valve assembly also includes a cover plate 108 arranged for attachment to the flange portion 106 by fasteners 110, such that, when the cover 108 is attached to the flange 106, the opening 105 is covered.

This allows the valve cartridge 11 to be inserted or removed from the casing 101 (i.e. when the cover plate 108 is detached from the flange portion 106) whilst inhibiting ingress of dirt/debris or damage to the valve 10 in operation (i.e. when the cover plate 108 is attached to the flange portion 106).

In the embodiment of FIGS. 1 to 4, the channel body 104 is integrally formed with the pipe 102. In the embodiment of FIGS. 1 to 4, the flange portion 106 and the channel body 104 are formed of separate components that are coupled together via any suitable means. In some embodiments (e.g. the embodiment of FIG. 6 described below), the channel body 104 and the flange portion 106 are integrally formed.

In alternative embodiments the channel body 104 is provided as one or more separate components for coupling to the pipe 102.

Figure 5:
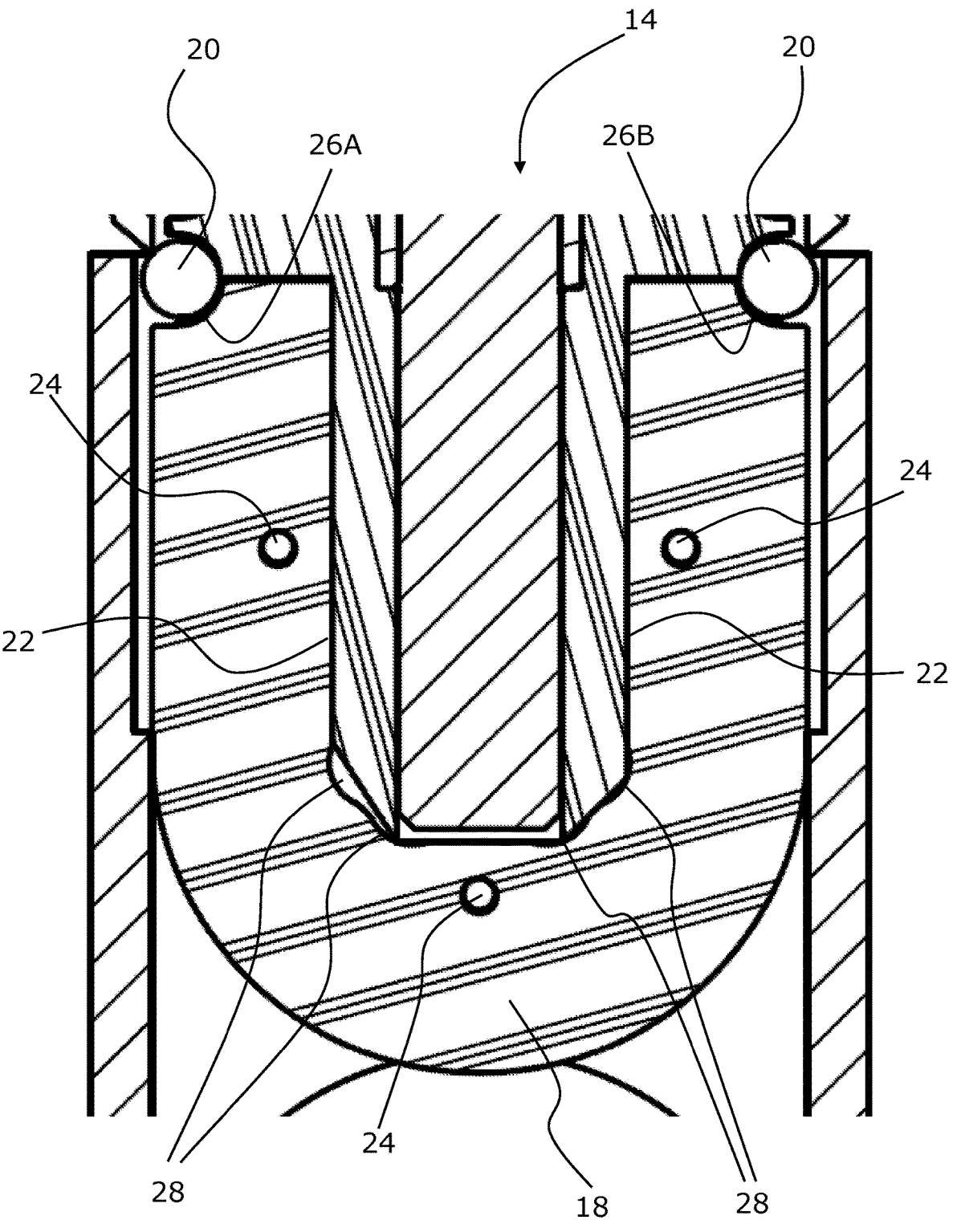
FIG. 5 is an enlarged view of the seals of the valve of FIGS. 3 and 4.
Figure 6:
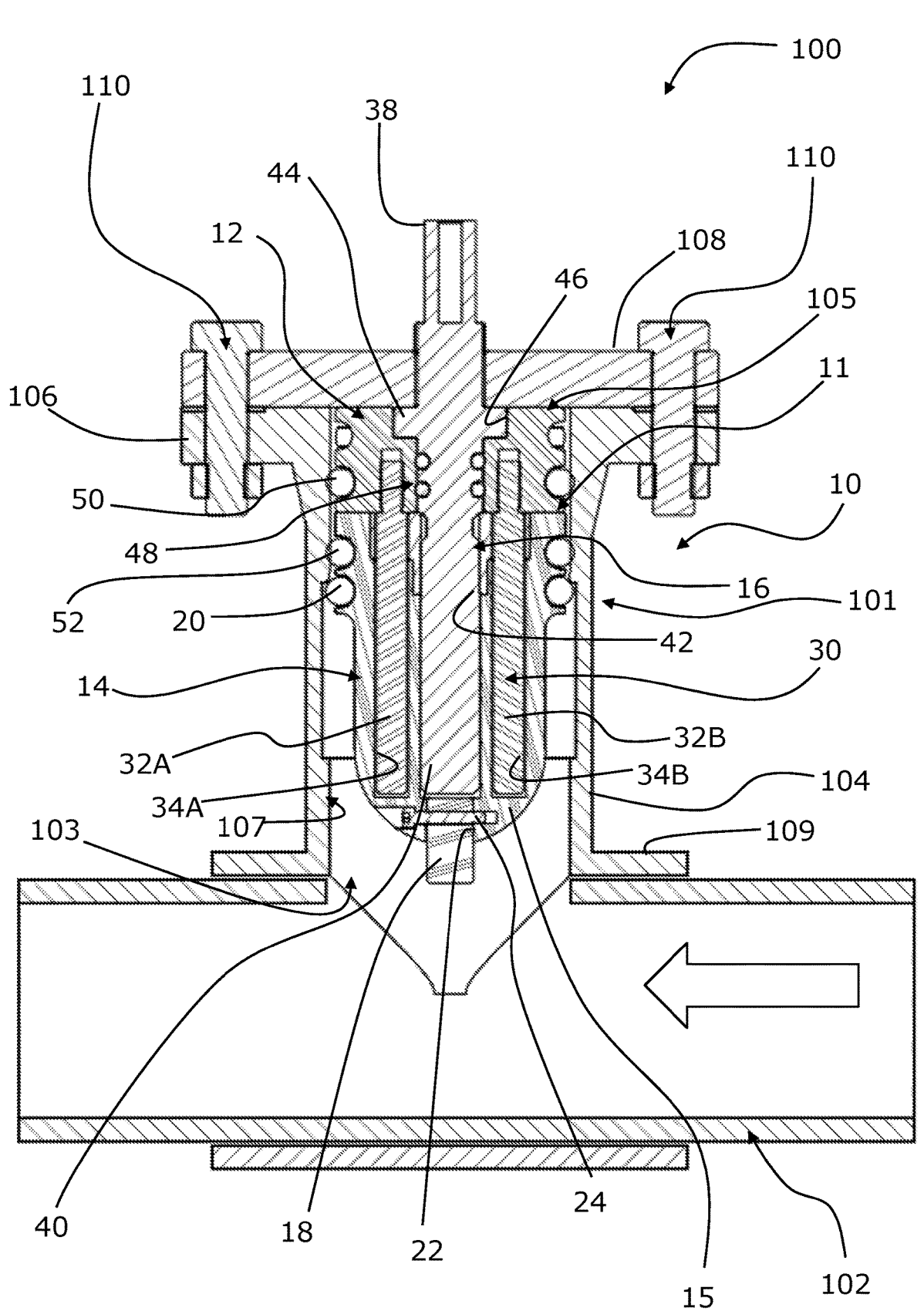
FIG. 6 depicts a live insertion valve assembly according to an embodiment, when the valve is in an inactive state, shown in cross-section along a longitudinal axis of the pipe.
Figure 7:
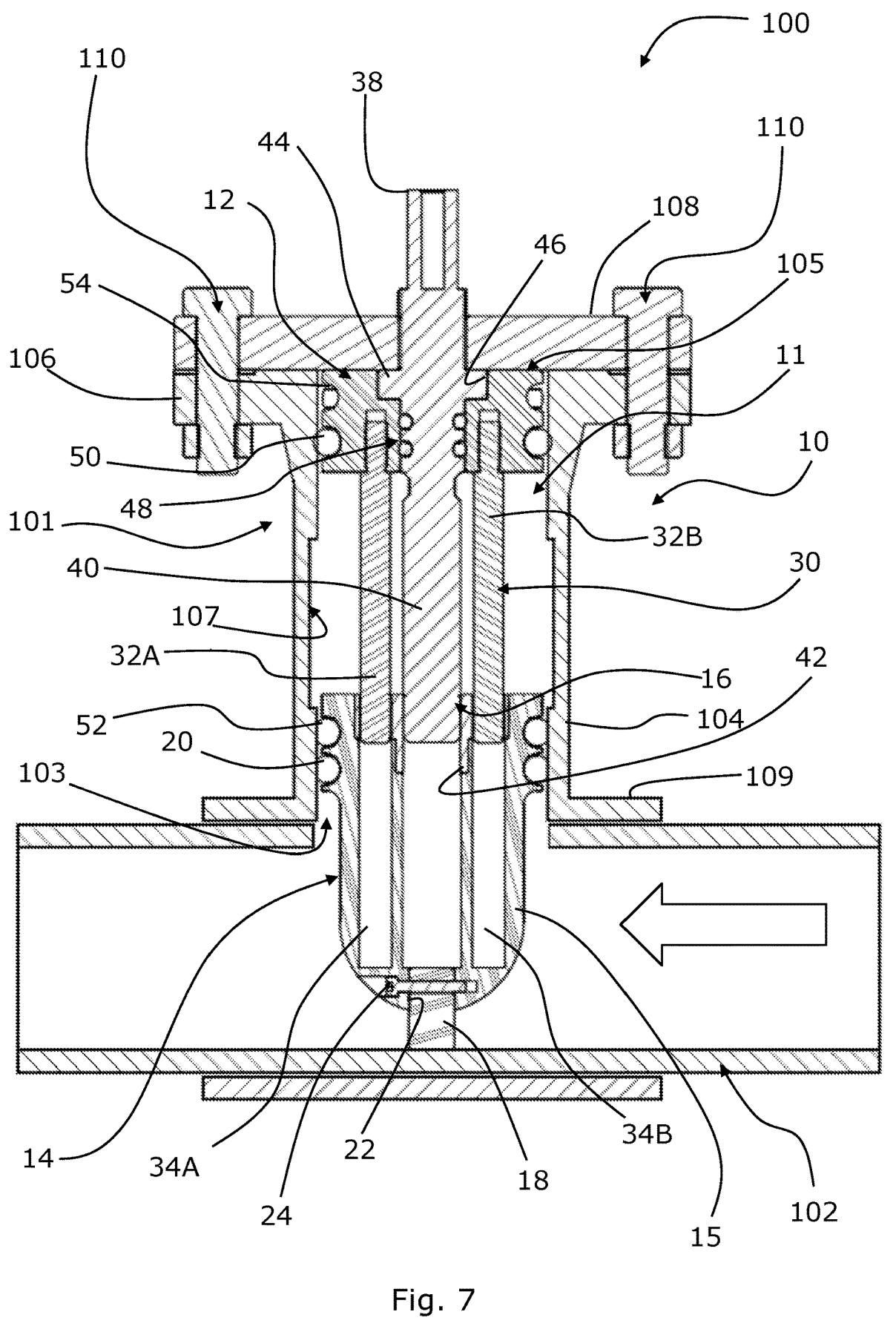
Figure 9A:
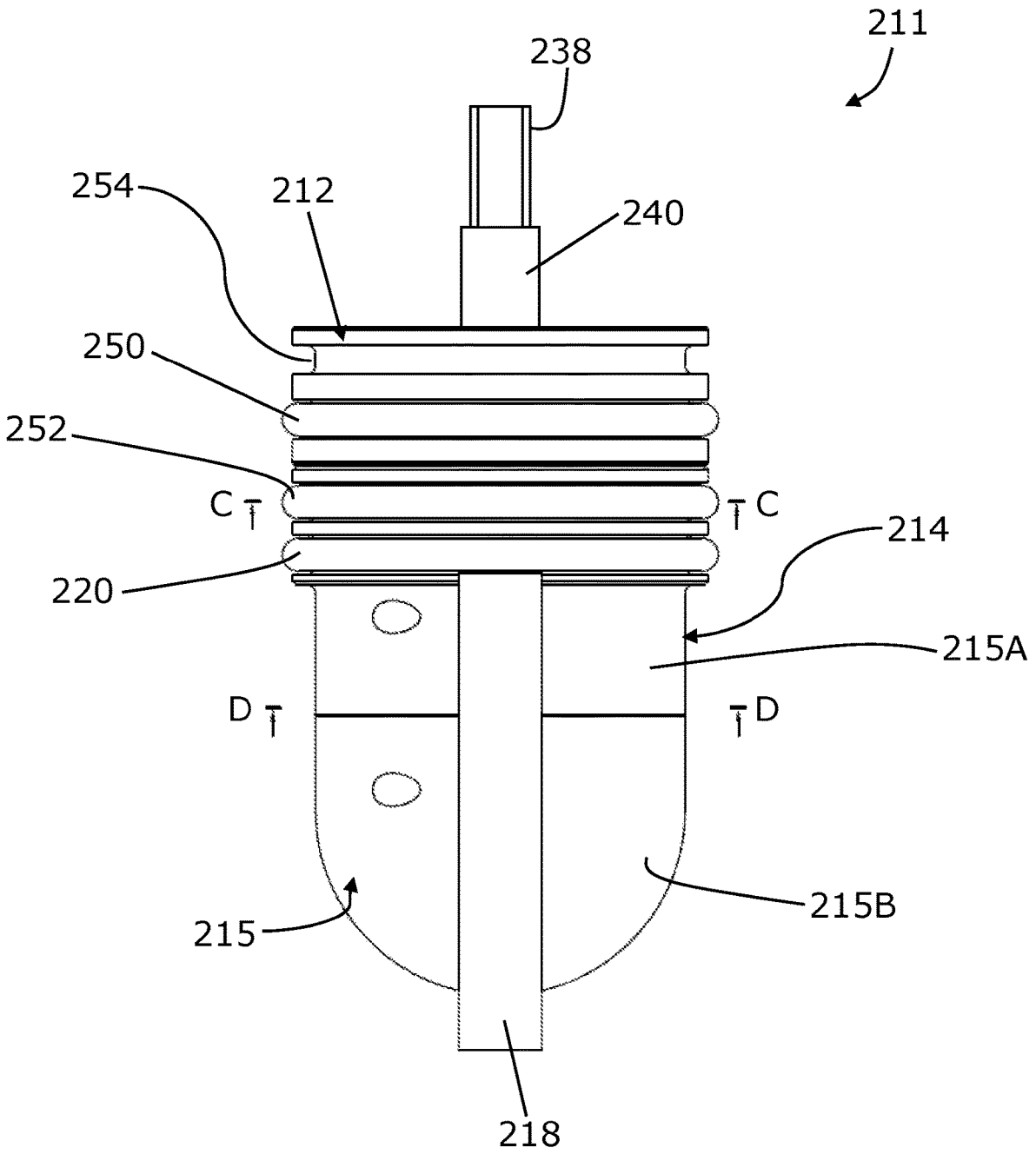
FIGS. 9a and 9b are side views of a valve cartridge for a live insertion valve according to an embodiment disclosed herein, in inactive and active states respectively.
Figure 9B:
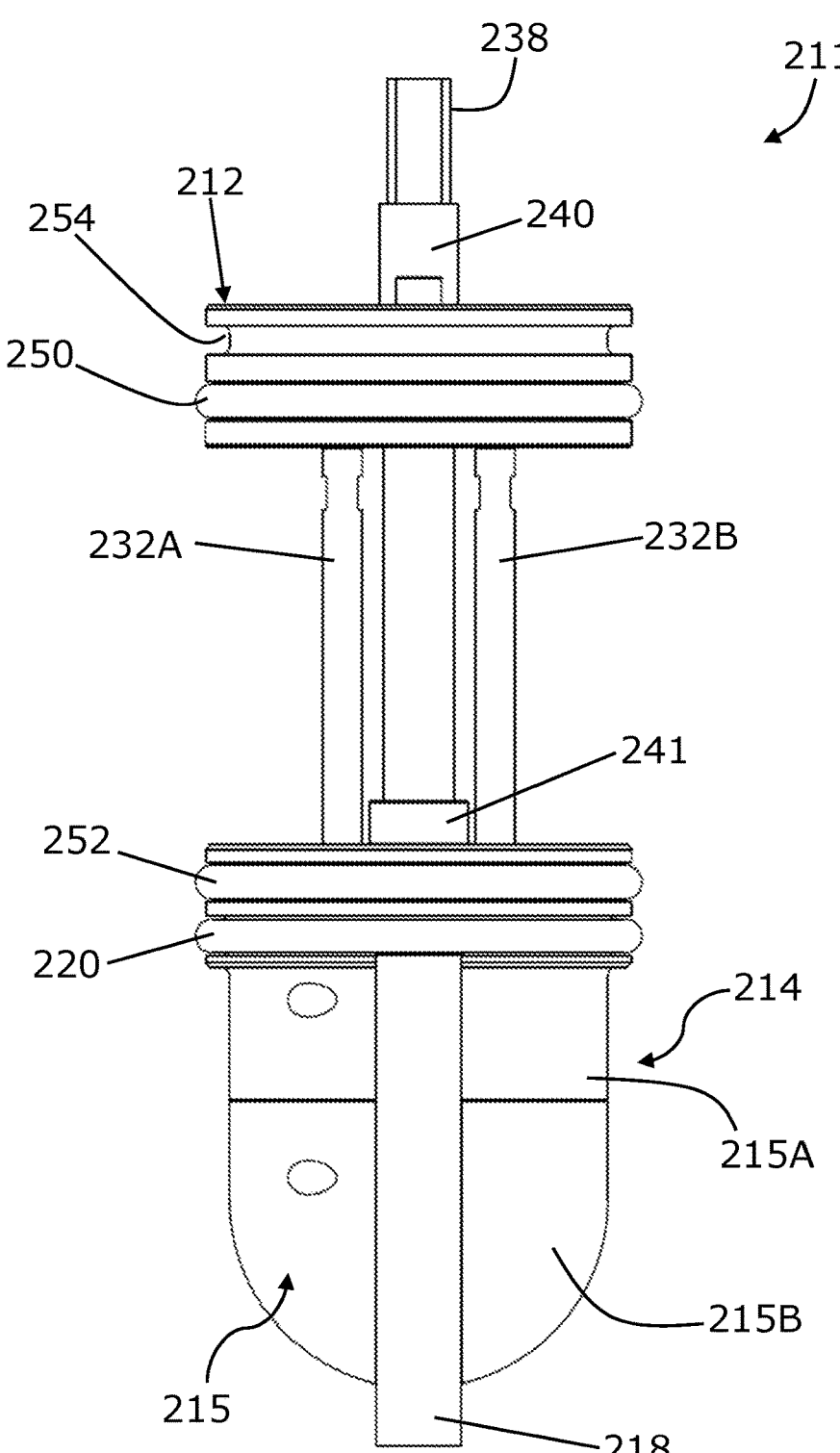
Figure 9C:
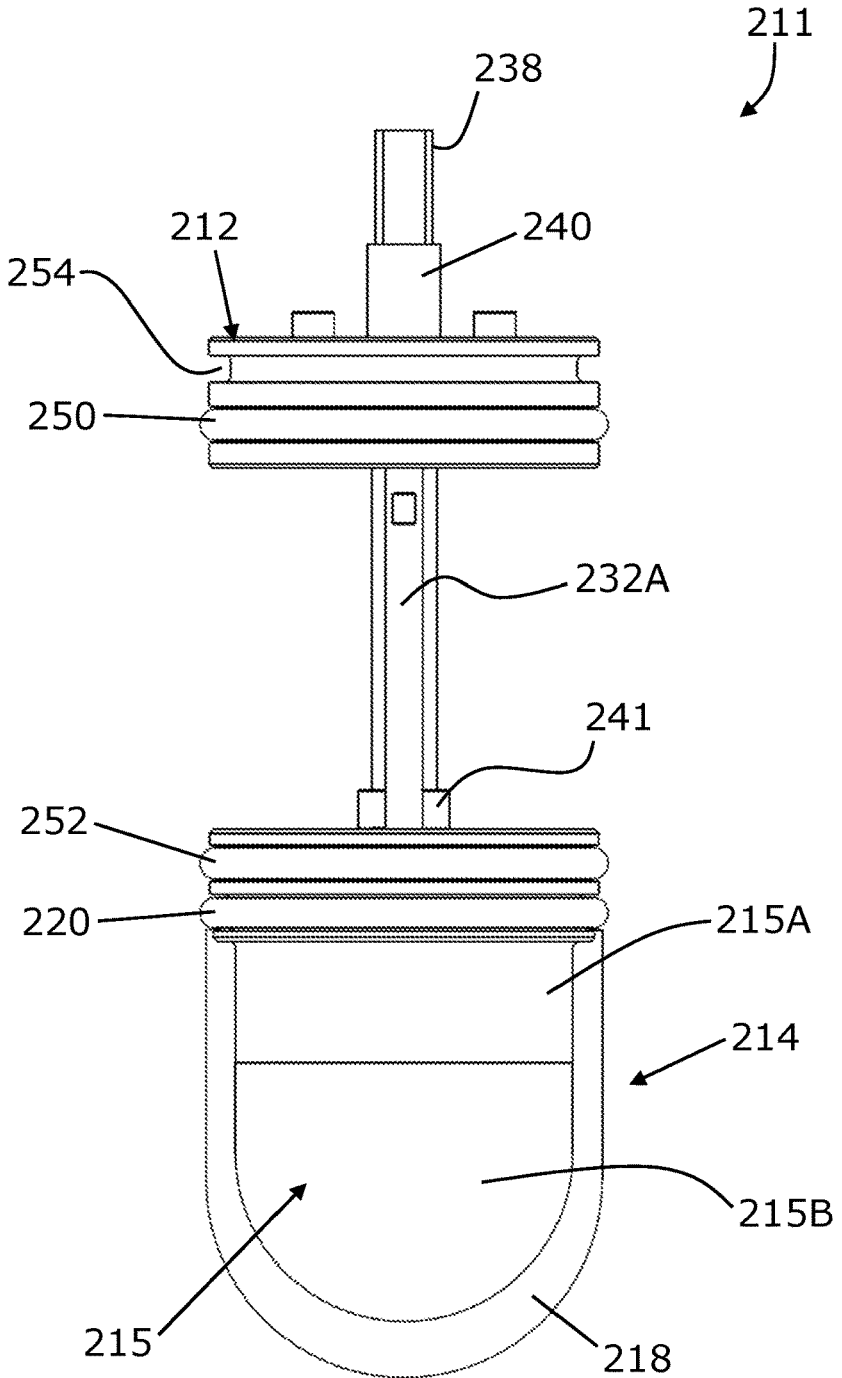
FIG. 9c is a front view of the valve cartridge of FIGS. 9a and 9b in the active state.
Figure 10:
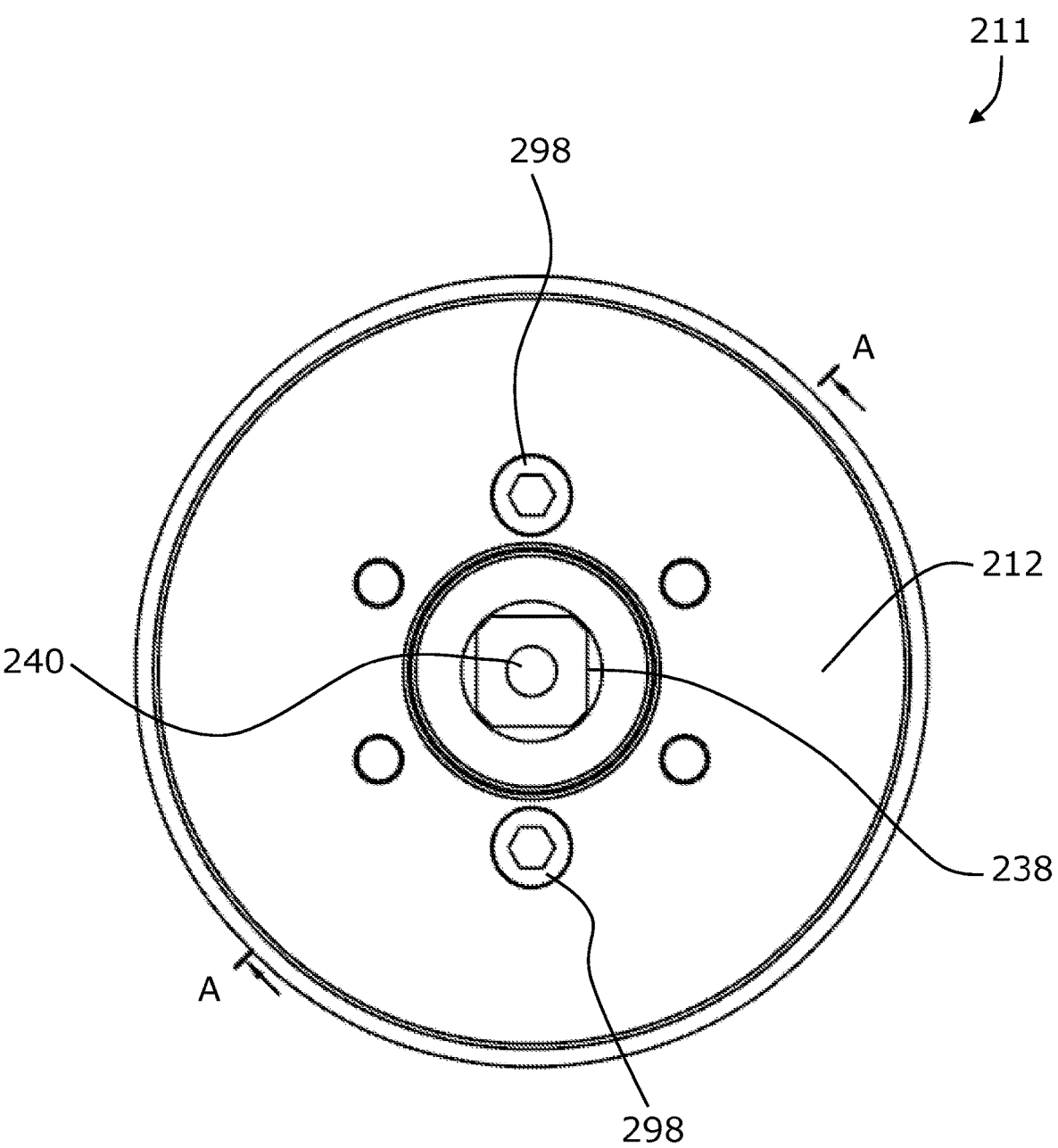
FIG. 10 is a plan view of valve cartridge of FIGS. 9*a* to 9*c;*

For example, FIGS. 6 and 7 depict an alternative live insertion valve assembly. Corresponding features between the embodiments of FIGS. 1 to 5 are given the same reference numerals and only differences are discussed.

In the embodiment of FIGS. 6 and 7, the casing 101 includes a saddle portion 109 for securing around the circumference of the pipe 102, and a channel body 104 extending from the saddle portion 109 in a direction transverse to the pipe 102. In the embodiment of FIGS. 6 and 7, the casing 101 is arranged to cover the opening 103 in the pipe 102, such that the channel body 104 surrounds the opening 103. In particular, the channel body 104 and the opening 103 are coaxial.

In the embodiment of FIGS. 6 and 7, the channel body 104 and flange portion 106 are integrally formed.

In the embodiment of FIGS. 6 and 7, the saddle portion 109 is substantially tubular (i.e. it surrounds the pipe 102). In alternative embodiments, the saddle portion 109 is formed in a two-part construction with a first saddle portion for covering a first portion of the pipe 102 (e.g. an upper portion) and a second saddle portion for covering a second portion of the pipe 102. It will be understood that in such embodiments the first and second saddle portions would be configured for attachment to each other (e.g. via fasteners).

In alternative embodiments, the saddle portion 109 is welded around the opening 103 of the pipe 102 (e.g. the lower portion of the saddle portion 109 may be omitted).

In alternative embodiments, the channel body 104 is welded around the opening 103 of the pipe 102 (e.g. the entire saddle portion 109 may be omitted).

In the embodiments of FIGS. 1 to 7, the valve cartridge 11 includes a fixed portion 12 and a valve member 14. The valve member 14 has a body 15.

The fixed portion 12 is arranged to facilitate correct positioning of the valve cartridge 11 within the casing 101 and pipe 102. In the illustrated embodiments, the fixed portion 12 is fastened to the cover plate 108 by means of fasteners 112. In alternative embodiments, the fixed portion 12 is fastened to the pipe 102 or an alternative part of the casing 101, for example the channel body 104 or flange portion 106.

Figure 2:
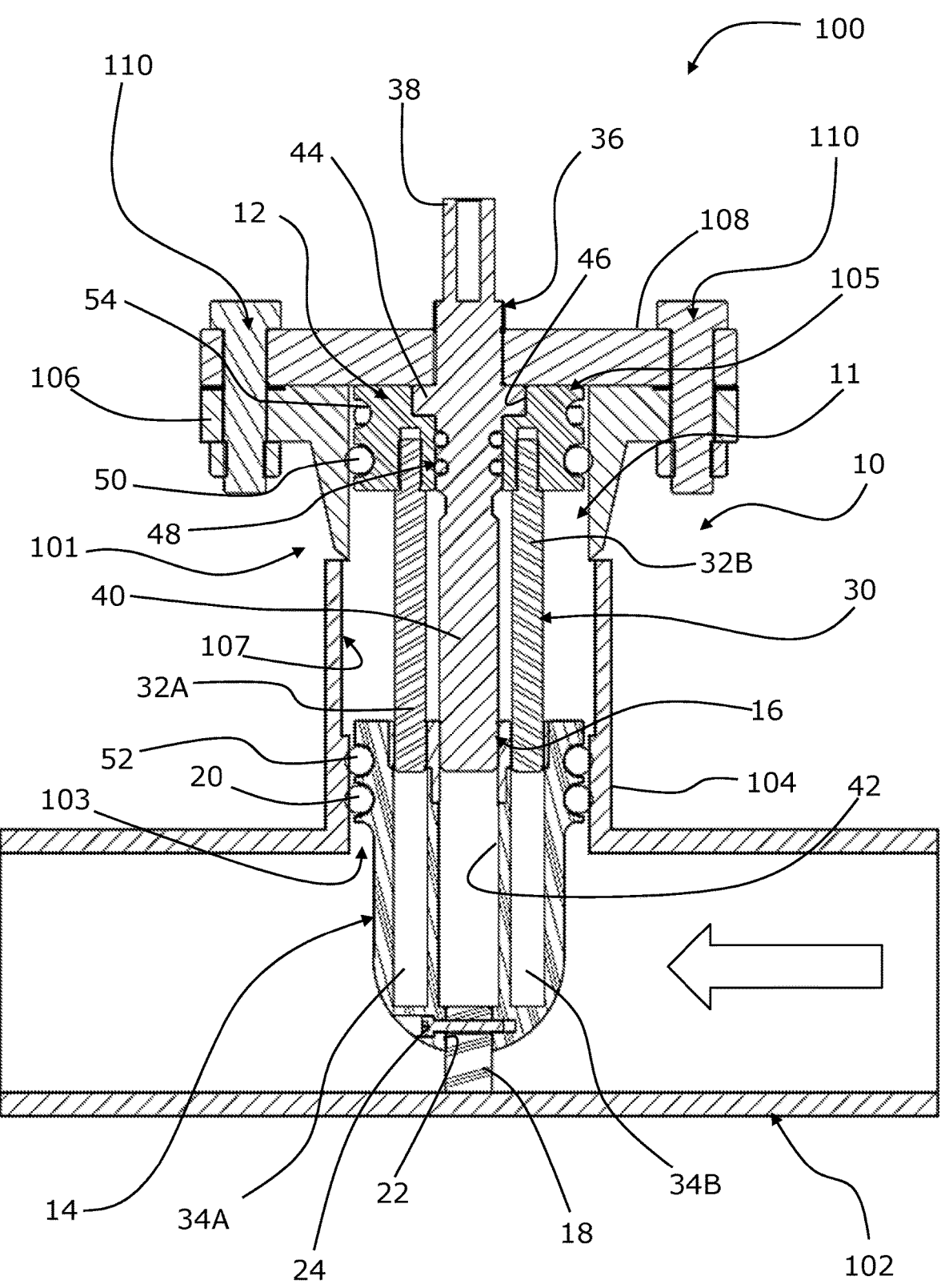
FIG. 2 shows the live insertion valve assembly of FIG. 1, with the valve in the active state.
Figure 3:
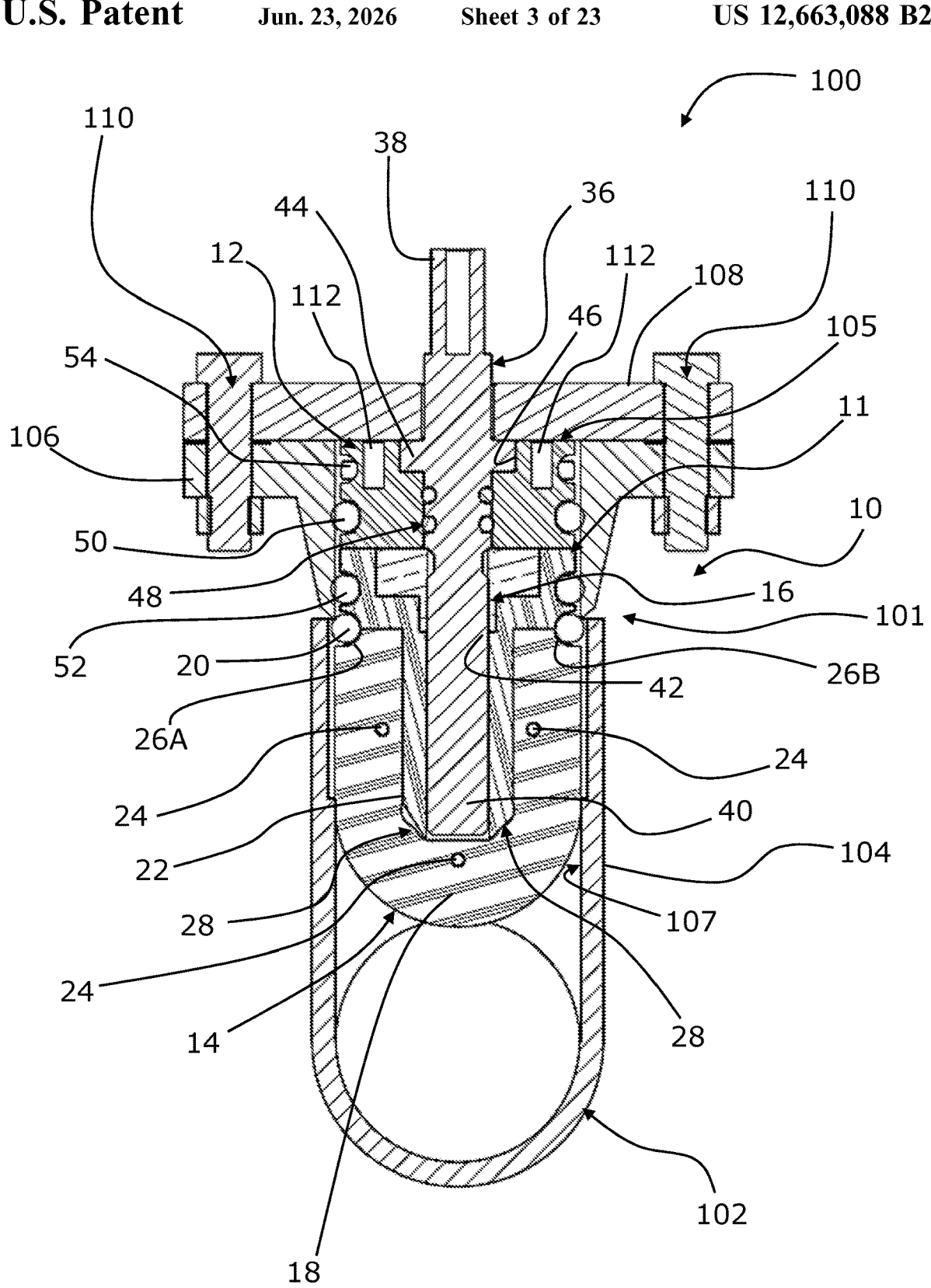
FIG. 3 depicts the live insertion valve assembly of FIG. 1, shown in cross-section along an axis transverse to the pipe.
Figure 4:
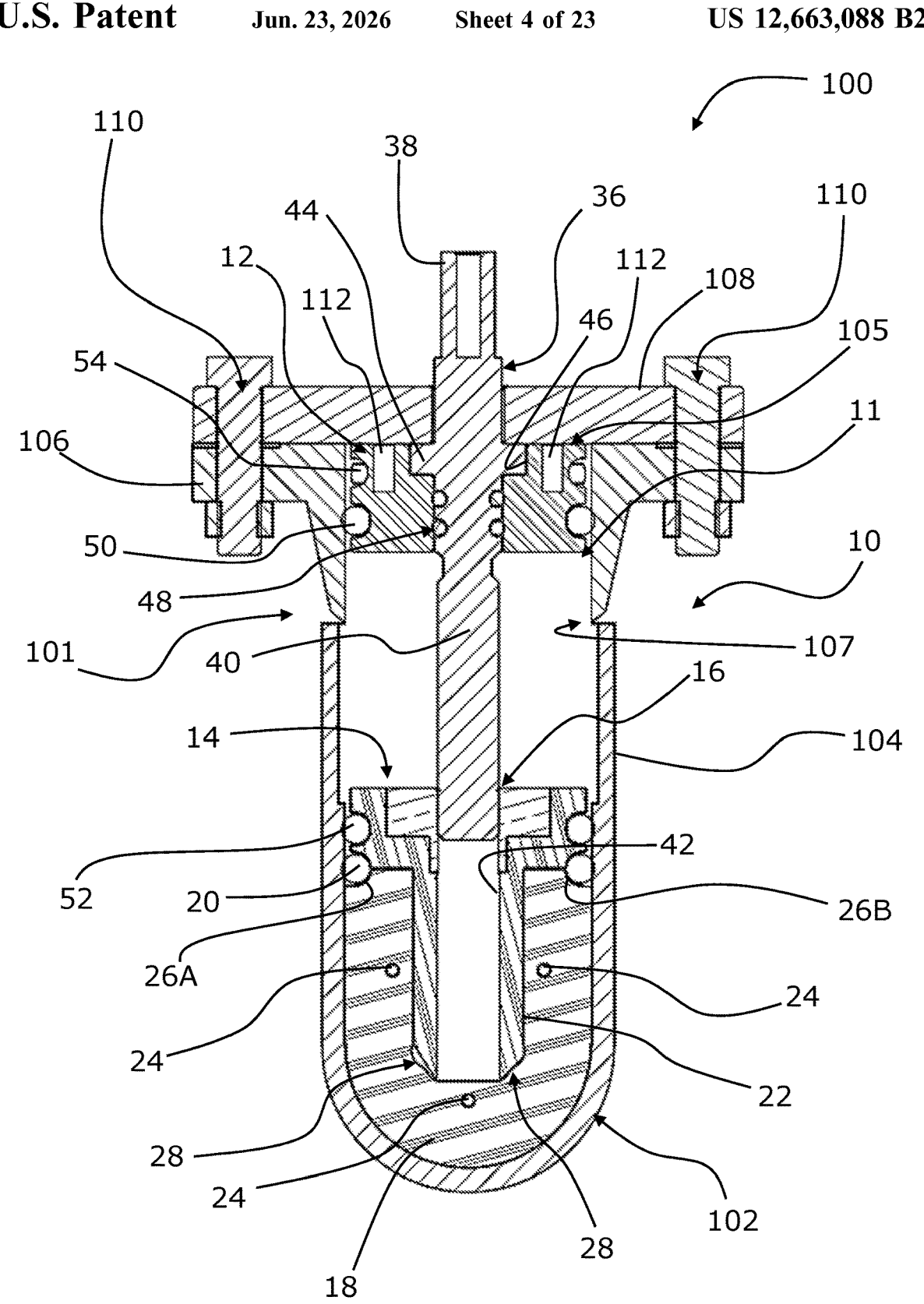
FIG. 4 shows the live insertion valve assembly of FIG. 3, with the valve in the active state.

The valve member 14 is configured to move between an inactive state (as depicted in FIGS. 1 and 3), in which the valve member 14 permits a flow of fluid through the pipe 102, and an active state (as depicted in FIGS. 2 and 4) in which the valve member 14 blocks a flow of fluid through the pipe 102.

As will be described in more detail below, the valve cartridge 11 includes an actuation mechanism 16 for moving the valve member 14 between the active and inactive states (i.e. for moving the valve member 14 relative to the fixed portion 12). In the illustrated embodiments, the actuation mechanism 16 is configured to move the valve member 14 linearly in a first and second opposite linear directions transverse to the pipe 102 (i.e. upwards and downwards in the view of FIGS. 1 to 4), in order to transition between the active and inactive states.

The valve member 14 has a first seal 18 for blocking a flow of fluid through the pipe 102 when the valve member 14 is in the active state. The valve member 14 also has a second seal 20 for blocking a flow of fluid in a direction transverse to the pipe 102 (i.e. for blocking flow of fluid along the cylindrical channel 107 defined by the channel body 104 and flange portion 106). It will be understood that when the valve member 14 blocks a flow of fluid through the pipe 102, pressure builds upstream of the valve member 14 which urges fluid in a transverse direction along the cylindrical channel 107, but that such a transverse flow is inhibited by the second seal 20.

The first seal 18 is a gate seal which is configured to extend in a first plane perpendicular to a longitudinal axis of the pipe 102. In the illustrated embodiments, the first seal 18 is a U-shaped gate seal, but in alternative embodiments the first seal 18 has a different shape.

The first seal 18 is fitted in a receiving groove 22 of the valve member 14, which provides a convenient means for securing the first seal 18 to the valve member (e.g. via fasteners 24 which extend across the receiving groove 22 and through the first seal 18). The receiving groove 22 has opposing inner faces connected by a perpendicular joining surface, which provides a tortuous path around an inner edge of the first seal 18 to inhibit leakage through the inner edge of the first seal 18. As best illustrated in FIGS. 3 to 5, the receiving groove 22 is approximately T-shaped to correspond to an inner edge of the U-shaped first seal 18. In alternative embodiments where the first seal 18 is of different shape, the receiving groove 22 will have a different shape which is complementary to the inner edge of the first seal 18.

The second seal 20 is arranged to act along a second plane which is perpendicular to the first plane of the first seal 18. In particular, the second seal 20 is an annular seal, which inhibits leakage around an entire circumference of the cylindrical channel 107. In the illustrated embodiments, the second seal 20 is an O-ring, which provides particularly effective circumferential sealing.

The second seal 20 is seated on the first seal 18 which acts to prevent a leak path being formed between the first and second seals 18, 20. This improves sealing performance of the valve 10. In particular, the first seal 18 has first and second seat portions 26A, 26B on opposing sides of the valve member 14 and the second seal 20 is seated on the first and second seat portions 26A, 26B (as illustrated in FIGS. 3 to 5).

In the illustrated embodiments, each of the seat portions 26A, 26B has a seat profile which conforms to a profile of a corresponding portion of the second seal 20. In particular, each seat portion 26A, 26B defines a curve or arc in cross-section which conforms to a cross-sectional profile of the second seal 20 (i.e. a cross-sectional profile of the second seal 20 and seat portion 26A, 26B taken along a plane parallel to a length of the channel 107 and/or direction of movement of the valve member 14). In other words, the seat portions 26A, 26B partially extend around the profile of the second seal 20. In other words, where the O-ring has a circular cross-sectional profile, the seat portions 26A, 26B partially extend around the circular profile.

While not visible in the figures, each seat portion 26A, 26B is also curved in a circumferential direction of the second seal 20 to conform to an inner circumference of the second seal 20. In other words, the second seal 20 extends closely around the seat portions 26A, 26B in a circumferential direction. It will be appreciated that the circumferential direction is with respect to the overall circumference of the annular O-ring, which is coaxial with the circumference of the channel 107 and/or valve member 14.

Such complementary seat profiles 26A, 26B increase the contact area between the first and second seals 18, 20, which improves sealing performance and inhibits a leak path between the first and second seals 18, 20.

It will be understood that, as the valve member 14 moves linearly from the inactive to the active states (as depicted in the transition from FIGS. 1 to 2 and the transition from FIGS. 3 to 4), the first seal 18 comes into contact with an inner surface of the pipe 102. As the first seal 18 is pressed against the inner surface of the pipe 102, the first seal 18 is compressed towards the second seal 20 when the valve member 14 is in the active state. In combination with the complementary seat profiles 26A, 26B, this compression improves the contact between the seals 18, 20, which inhibits generation of a leak path and hence improves seal performance.

In the illustrated embodiments, the first and second seals 18, 20 are formed of a compressible material, which allows the seals 18, 20 to conform to the shape of each other, which inhibits generation of a leak path therebetween and hence improves seal performance. In addition, the first and second seals 18, 20 being formed of a compressible material also allows them to adapt to a certain extent to the shape of the pipe 102 and channel 107, which improves seal performance.

As best illustrated in FIG. 5, the first seal 18 also has a series of deformation reliefs 28 which are configured to permit asymmetrical deformation of the first seal 18 when the valve member 14 is in the active state. Such deformation reliefs 28 improve sealing performance in pipes with particularly uneven or non-circular internal profiles. Asymmetrical deformation may be with respect to an axis of symmetry which is along the direction of movement of the valve member 14. In other words, the asymmetrical deformation may be with respect to a plane of symmetry which is perpendicular to the first plane defined by the first seal, and which is parallel to a direction of movement of the valve member 14.

In the illustrated embodiments, the deformation reliefs 28 are recesses on the inner edge of the first seal 18. In alternative embodiments, the deformation reliefs 28 are reduced-thickness regions of the first seal 18 (e.g. reduced-thickness portions along the inner edge of the first seal 18). In alternative embodiments, the deformation reliefs 28 are regions of the first seal 18 which are made from a material which is more compressible than the rest of the first seal 18.

In addition to the first and second seals 18, 20 of the valve member 14, the valve cartridge 11 also includes a number of other seals which provide additional sealing in a transverse direction (e.g. to provide back-up sealing in the event that fluid manages to pass between the second seal 20 and the wall of the channel 107). For example: a sealing arrangement 48 in the form of two O-rings is provided between a leadscrew 40 (described in more detail below) and the fixed portion 12; one or more seals 50 (e.g. O-rings) are provided on the fixed portion 12 for sealing the fixed portion 12 against the flange portion 106; and a back-up seal 52 is provided on the valve member 14 above the second seal 20 as an additional seal for sealing the valve member 14 against the wall of the channel 107.

Each of the seals 20, 48, 50, 52 is fitted in a corresponding annular groove in the fixed portion 12, valve member 14 or leadscrew 40 respectively.

In the illustrated embodiments, the valve cartridge 11 has an anti-rotation arrangement 30 configured to inhibit rotation of the valve member 14 relative to the pipe 102. Such an anti-rotation arrangement 30 improves sealing by preventing rotation which could lead to gaps forming between the first seal 18 and the pipe 102. Fixing the valve member 14 rotationally also facilitates use of a leadscrew actuation mechanism 16, which will be described in more detail below.

As best illustrated in FIGS. 1 and 2, the anti-rotation arrangement 30 includes a pair of spaced apart rods 32A, 32B fastened to the fixed portion 12 (i.e. fixed relative to the pipe 102) and a corresponding pair of spaced apart channels 34A, 34B in the valve member 14 for receiving the spaced apart rods 32A, 32B. Such an anti-rotation arrangement 30 permits linear movement of the valve member 14 (since the rods 32A, 32B can slide within the channels 34A, 34B) but inhibits rotational movement, since the rods 32A, 32B cannot move in a transverse direction relative to a longitudinal axis of the channels 34A, 34B.

In alternative embodiments, the rods 32A, 32B are coupled to the valve member 14 and the corresponding channels 34A, 34B are provided in the fixed portion.

In alternative embodiments, the anti-rotation arrangement 30 has only a single rod and corresponding channel. In such embodiments, the rod and channel are off-centre with respect to a longitudinal axis of the valve cartridge 11, and relative rotation between the fixed portion 12 and the valve member 14 around the rod is inhibited by the fixed portion 12 and valve member 14 being a close fit with the cylindrical channel 107 of the casing 101. In other words, the valve cartridge 11 and casing 101 are configured so that eccentric rotation of the fixed portion 12 and/or the valve member 14 about the rod is inhibited.

In alternative embodiments, the anti-rotation arrangement 30 has one or more different sorts of projections (e.g. elongate projections with a non-circular cross-section) and corresponding channels (e.g. elongate channels of corresponding non-circular cross-section).

In alternative embodiments, the anti-rotation arrangement 30 is provided in the form of complementary engagements between the valve member 14 and the casing 101 (e.g. corresponding hex profiles or lugs on the valve member 14 and complementary linear grooves in the channel body 104, etc.).

The actuation mechanism 16 has a rotatable member 36 and is configured so that rotation of the rotatable member 36 in a first direction causes the valve member 14 to move in a first linear direction towards the active state, and rotation of the rotatable member 36 in a second direction causes the valve member 14 to move in a second linear direction opposite the first linear direction towards the inactive state.

Having such a rotatable member 36 allows standard rotational tools (e.g. allen keys, spanners, screw drivers and the like) to be used to actuate the valve member 14. In particular, the rotatable member 36 extends through the cover plate 108 so that such tools can be coupled to an engagement portion 38 (e.g. a socket or hex) at an exposed end of the rotatable member 36.

In the illustrated embodiments, the actuation mechanism 16 is a leadscrew mechanism having a leadscrew 40 and a corresponding bore 42 in the valve member 14 for receiving the leadscrew 40. The leadscrew 40 and bore 42 have complementary threads. It will be understood that, because the anti-rotation arrangement 30 inhibits rotation of the valve member 14 relative to the pipe 102, the complementary threads of the leadscrew 40 and bore 42 will cause the valve member 14 to move linearly when the leadscrew 40 is rotated (i.e. to transition between the active and inactive states).

In the illustrated embodiments, the leadscrew 40 is coupled to the fixed portion 12 by a flange portion 44 of the leadscrew 40 which sits in a corresponding annular seat 46 in the fixed portion 12. In exemplary embodiments, a thrust bearing is provided between the fixed portion 12 and the leadscrew 40 (i.e. between the flange portion 44 of the leadscrew 40 and the seat 46 of the fixed portion). Such a thrust bearing facilitates easy rotation of the leadscrew 40 (e.g. using unpowered hand tools).

In alternative embodiments, the actuation mechanism 16 is a ballscrew mechanism, roller screw mechanism or other type of linear actuator mechanism instead of a leadscrew mechanism.

It will be understood that the valve cartridge 11 can be manufactured in a range of sizes for application in pipes 102 of different predetermined diameters. In each case, the valve cartridge 11 is configured so that the number of turns of the rotatable member 36 required to move the valve member 14 from the active state to the inactive state and vice versa is a predetermined number of turns for the predetermined diameter of the pipe 102. In particular, the number of turns required for different diameters of pipe 102 are shown in FIG. 8, which conforms to industry standards.

Having an industry standard number of turns allows an experienced operator to know when the valve 10 has been fully opened/closed based on the number of turns applied to the rotatable member 36.

Referring again to FIGS. 6 and 7, to install the valve 10, the casing 101 is attached to the pipe 102 and the opening 103 is cut through the pipe 102 such that there is fluid communication therebetween. In some embodiments, the pipe opening 103 is cut first and then the casing 101 is coupled to the pipe, and in other embodiments the order is reversed (i.e. the pipe opening 103 is cut by tools inserted through the casing 101). Flow of fluid from a pipe which is in service may be controlled via a temporary slide gate. In this way, the live insertion valve can be fitted to a pipe without requiring shutdown of a portion of the fluid network.

In the embodiment of FIGS. 1 to 4, the step of cutting the pipe 102 would be omitted, since the channel body 104 and pipe 102 are integrally formed (i.e. as a T-shaped pipe section).

Once the casing 101 has been attached to the pipe 102, the valve cartridge 11 is inserted through the opening 105 of the casing 101. The cover plate 108 is fastened to the flange portion 106 of the casing 101 so that the valve cartridge 11 is sealed within the pipe arrangement 100 defined by the pipe 102 and the casing 101. Typically, the valve cartridge 11 will be installed in the inactive configuration illustrated in FIGS. 1 and 3 (i.e. with the valve member 14 in contact with the fixed portion 12), so that the first seal 18 does not block the flow of fluid along pipe 102, 1102 initially.

When it is desired to actuate the valve 10, an operator uses a suitable tool to rotate the rotatable member 36 in a first direction (e.g. clockwise), which causes the valve member 14 to move downwards. The operator continues to turn the rotatable member 36 until it is no longer possible to keep rotating and/or the predetermined number of turns has been applied. At this point, the valve member 14 will be in the active state illustrated in FIGS. 2 and 4, and flow of fluid will be blocked along the pipe 102 (by first seal 18) and blocked along the channel 107 (by second seal 20). This allows maintenance or repair to be carried out downstream of the valve 10.

When it is desired to open the valve 10 (e.g. when downstream maintenance or repair has been completed), the operator uses a suitable tool to rotate the rotatable member 36 in a second direction (e.g. anti-clockwise), which causes the valve member 14 to move upwards. This will quickly allow some flow around the first seal 18 and along the pipe 102. However, typically the operator will continue to rotate the rotatable member 36 in the second direction until it is no longer possible to keep rotating and/or the predetermined number of turns have been applied. At this point, the valve member 14 will be in the inactive state illustrated in FIGS. 1 and 3.

The process described above can be repeated as and when it is desirable to block/permit flow of fluid along the pipe 102.

Referring now to FIGS. 9a to 17, a valve cartridge according to an embodiment is indicated at 211. The valve cartridge 211 is configured for use in a live insertion valve assembly of the kind described above in relation to FIGS. 1 to 7. In other words, the valve cartridge 211 can replace the valve cartridge 11 in the valve assembly 100 of FIGS. 1 to 7. Common features between the valve cartridge 11 of FIGS. 1 to 7 and the valve cartridge 211 of this embodiment are given the prefix "2" and only differences between the valve cartridges will be discussed in detail.

The valve cartridge 211 has a leadscrew mechanism 216 which includes a leadscrew 240 and a lead nut 241 which defines an axial bore 242. The lead nut 241 is coupled to a socket 256 in the body 215 of the valve member 214. The leadscrew 240 and axial bore 242 have complementary threads, which are configured to co-operate such that the lead nut 241 moves linearly along the leadscrew 240 when the leadscrew 240 rotates relative to the lead nut 241.

Figure 11A:
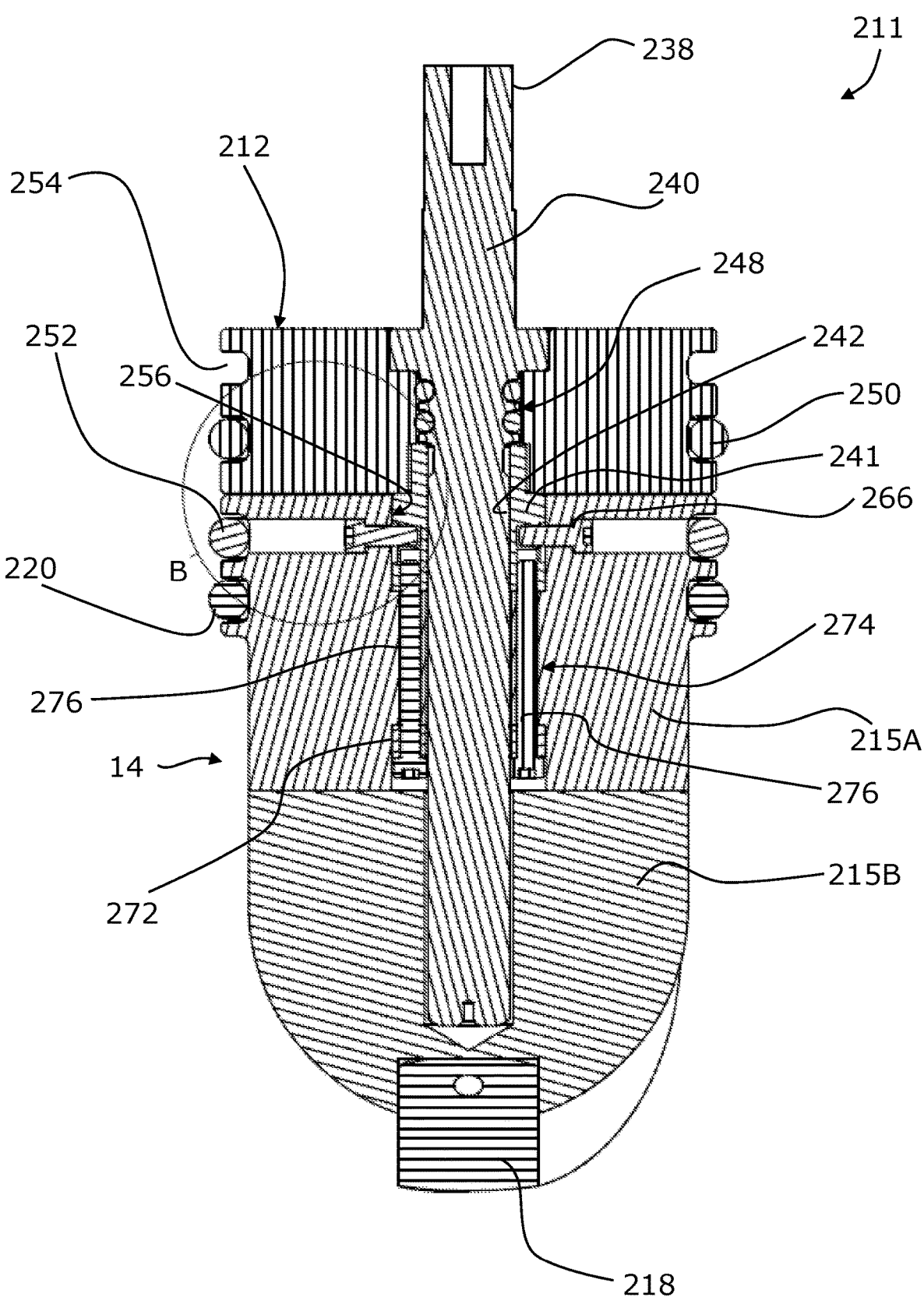
Figure 11B:
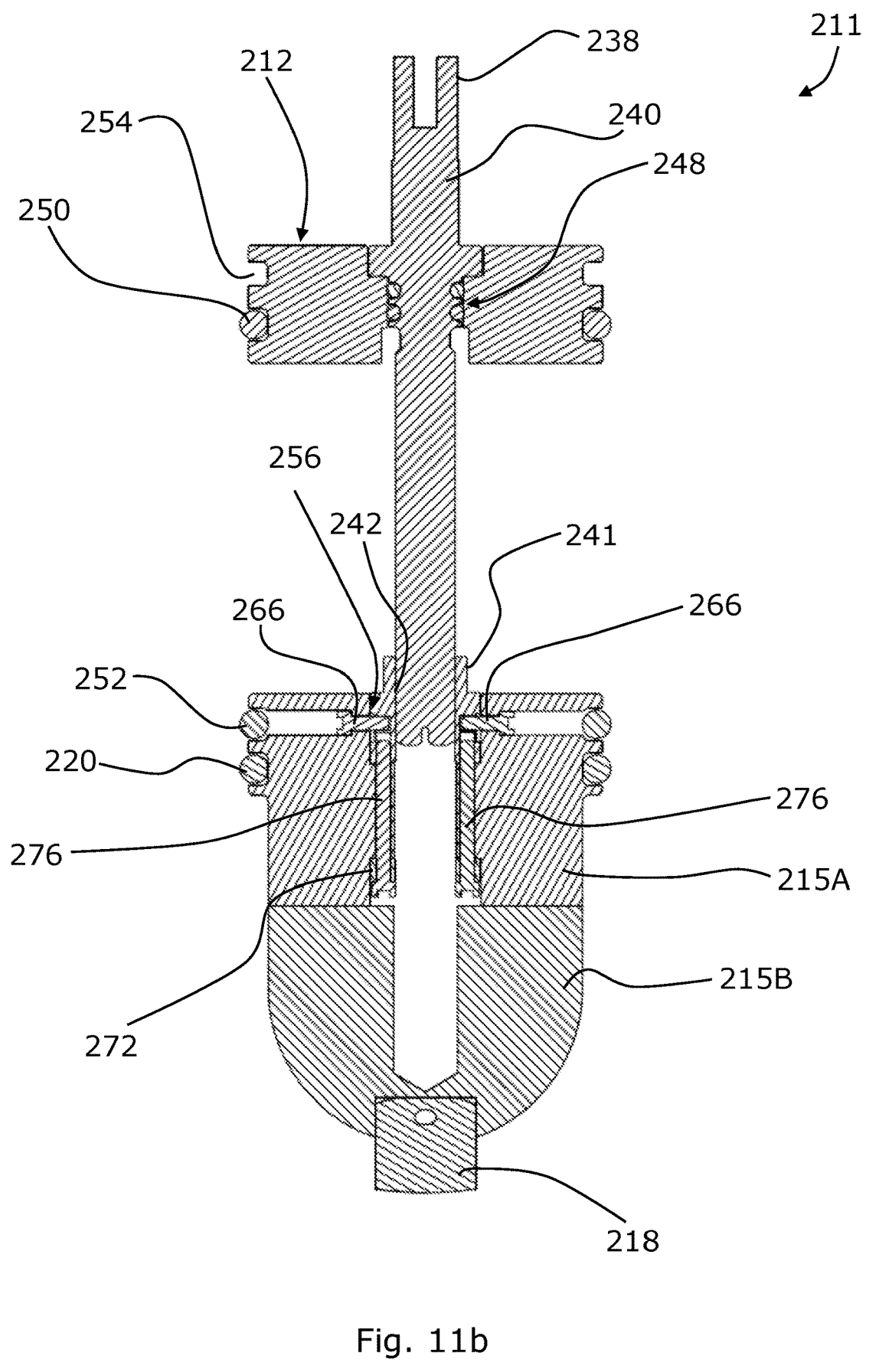
Figure 12:
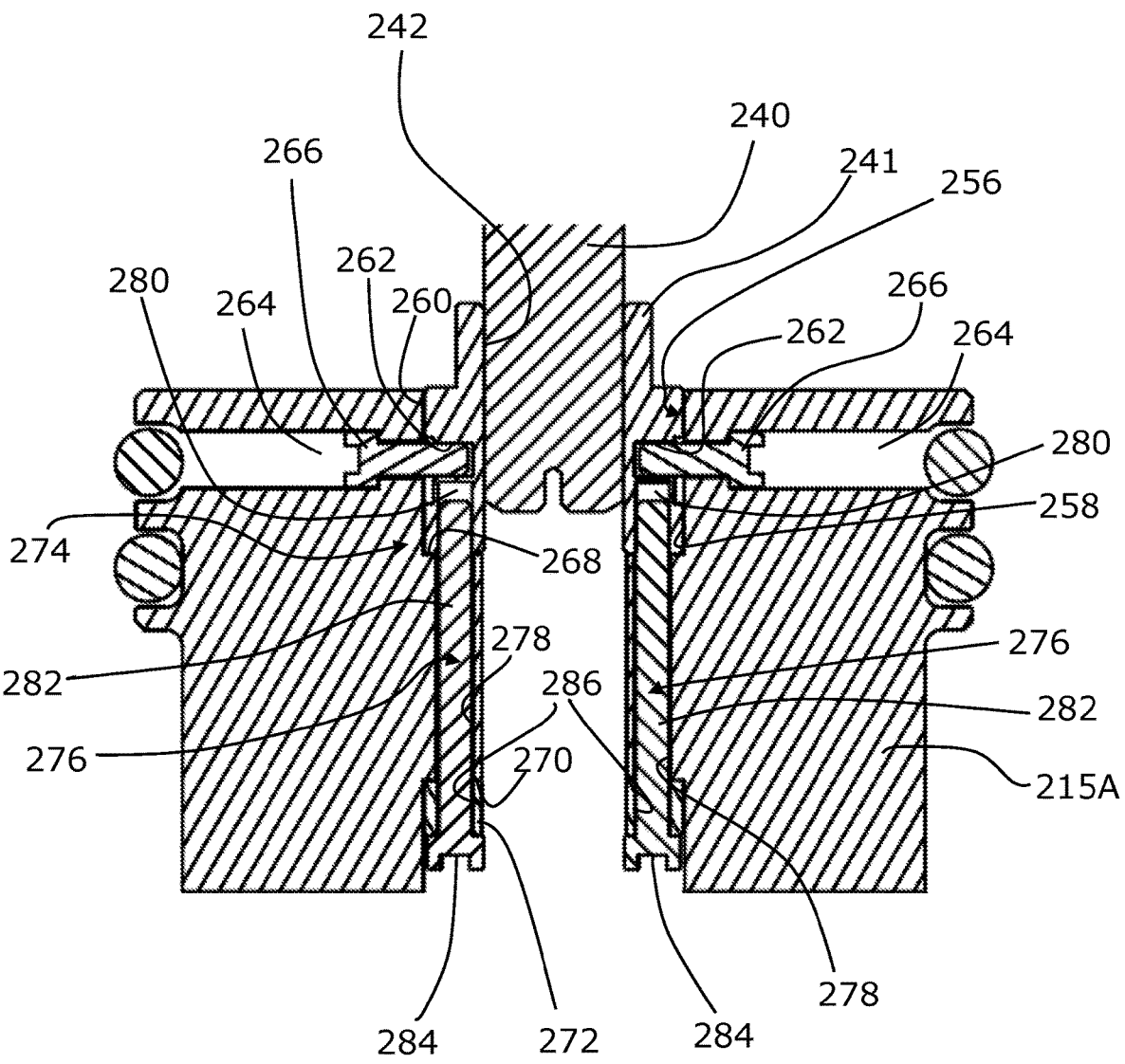
FIG. 12 is an enlarged view of the lead nut, first body portion and clamping arrangement of the valve cartridge of FIG. 11*b;*

As best illustrated in FIGS. 11a to 12, the socket 256 defines a first surface 268 (i.e. a shoulder) for abutment with the lead nut 241, and the body 215 of the valve member 214 defines a second surface 270 (i.e. shoulder) for abutment with a support element 272. In the illustrated embodiment, the first and second surfaces 268, 270 each extend radially and face opposite axial directions. In alternative embodiments, the first and/or second surface 268, 270 has a different configuration (e.g. the first and/or second surface 268, 270 may be angled relative to the bore 242).

The valve member 214 has a clamping arrangement 274 configured to urge the lead nut 241 and support element 270 towards the respective first and second surfaces 268, 270 to clamp the lead nut 241 to the body 215. The clamping arrangement 274 includes a plurality of connecting elements 276 for coupling the lead nut 241 to the support element 272. The connecting elements 276 extend between the lead nut 241 and the support element 272. In particular, the connecting elements 276 extend in a corresponding plurality of axial through-holes 278 of the body 215 between the first and second surfaces 268, 270.

In the illustrated embodiment, the connecting elements 276 are fasteners having a shaft 282 and a head 284. The shafts 282 are threaded and the free ends of the shafts 282 are received in complementary threaded axial holes 280 in the lead nut 241. In this way, as the shafts 282 of the connecting elements 276 are rotated within the axial holes 280 of the lead nut 241, the complementary threads cause the lead nut 241 to move linearly (i.e. towards the first surface 268).

Figure 15:
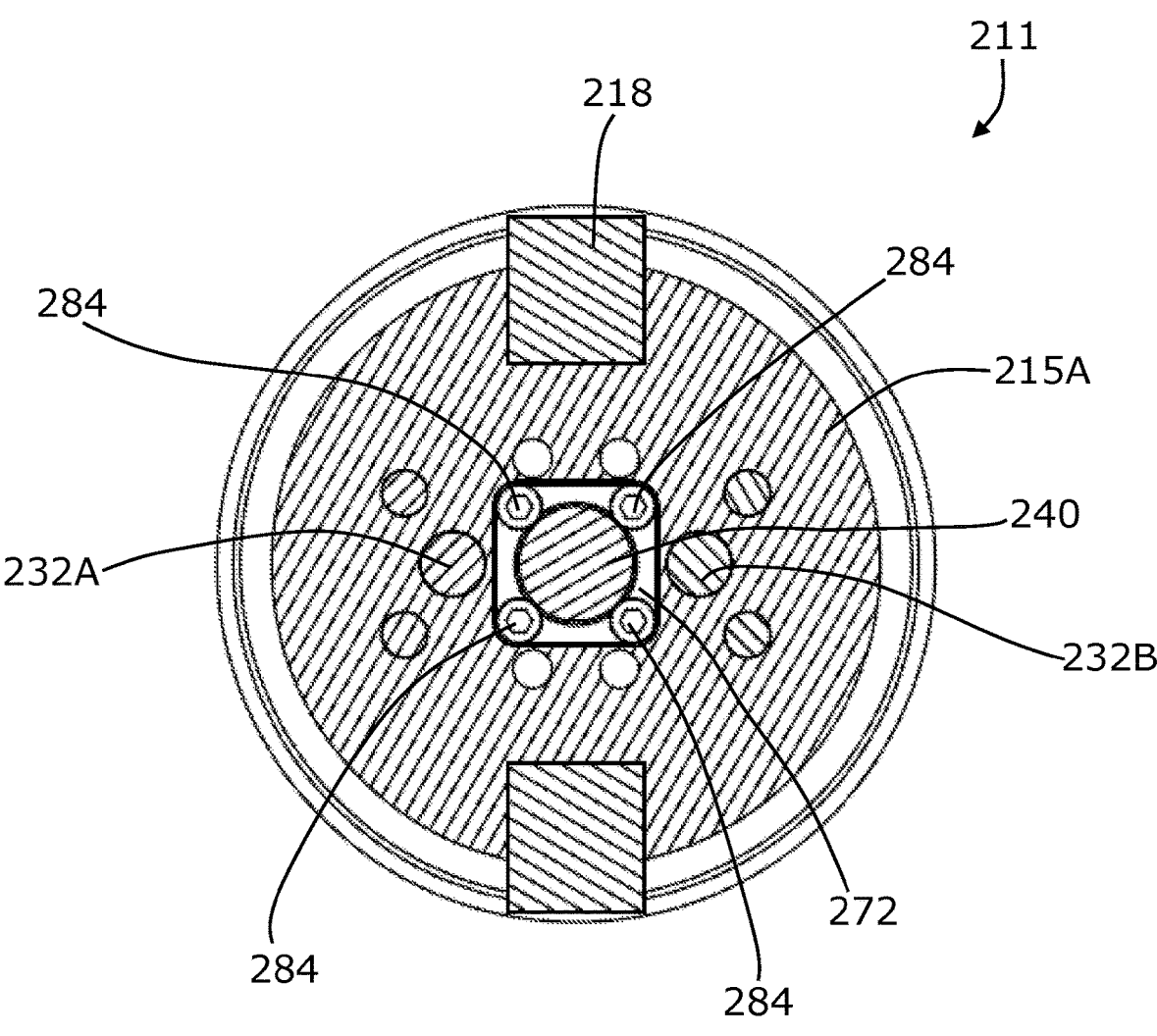
FIG. 15 is a sectional view of the valve cartridge of FIGS. 9*a* to 14 taken along line D-D.

The support element 272 has a plurality of axial through-holes 286 for receiving the shafts 282 of the connecting elements 276 (e.g. as illustrated in FIG. 15). The heads 284 of the connecting elements 276 are configured to push the support element 272 towards the second surface 270 as the shafts 282 are rotated within the threaded axial holes 280 in the lead nut 241.

It will therefore be understood that rotating the connecting elements 276 in a tightening direction causes a simultaneous urging of the lead nut 241 and the support element 272 towards each other so that they each abut against the respective first or second surface 268, 270, which clamps the lead nut 241 to the socket 256 of the body 215.

In alternative embodiments, the lead nut 241 has through-holes and the support bracket 272 has threaded holes. In such embodiments, the connecting elements 276 are flipped upside down so that the heads 284 are configured to push the lead nut 241 towards the first surface 268 and the threaded shaft 282 is configured to engage the threaded holes of the support element 272 to pull the support element 272 towards the second surface 270.

In alternative embodiments, the support element 272 is omitted. In such embodiments, the heads 284 engage directly with the second surface 270 of the body 215. In such embodiments, the heads 284 can be thought of as support elements, whereas the shafts 282 are connecting elements which are integrally formed with the heads 284.

Figure 14:
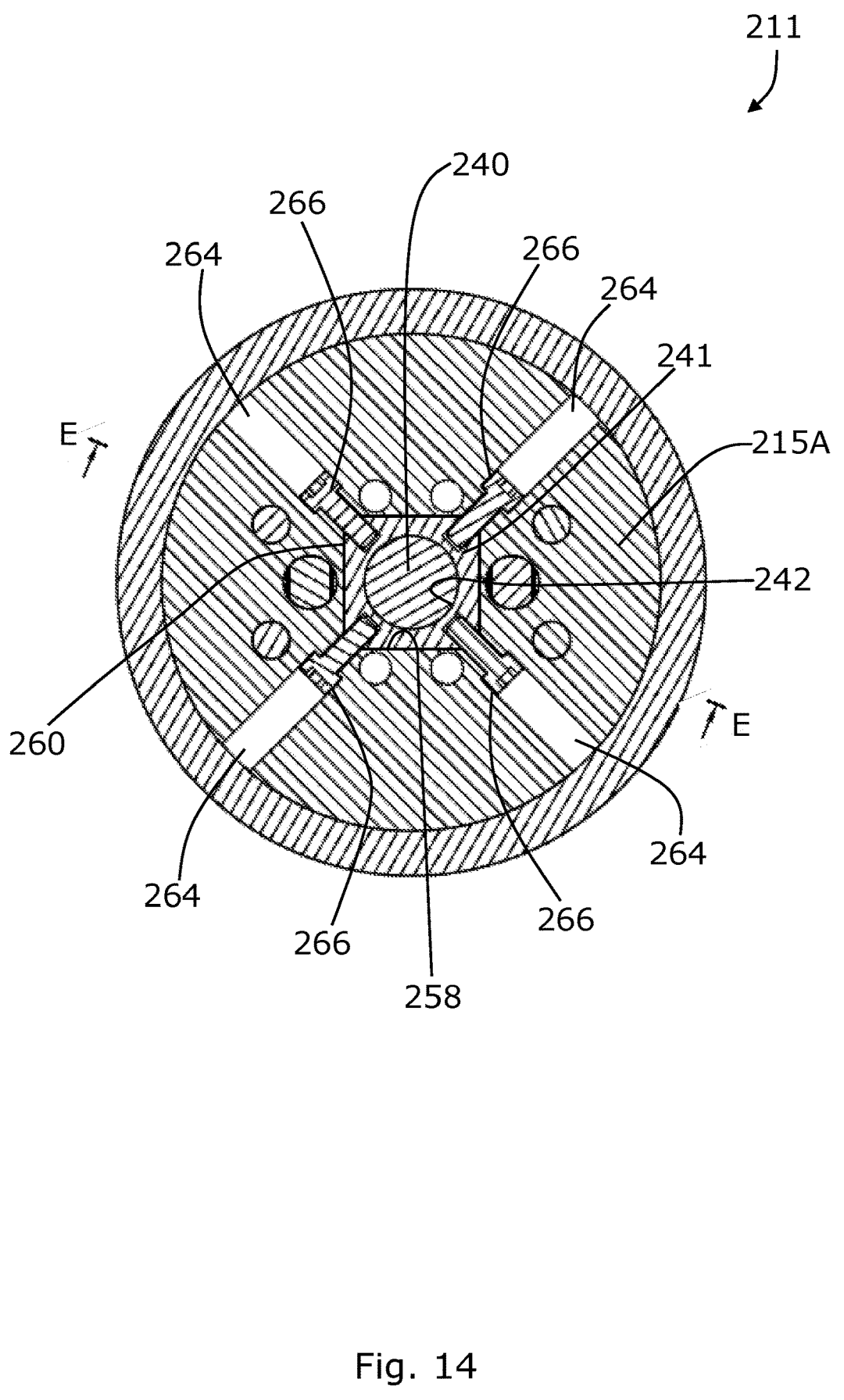

To facilitate effective functioning of the leadscrew mechanism 216, the socket 256 has a first formation 258 and the lead nut 241 has a second formation 260 configured to engage the first formation 258 to inhibit relative rotation between the lead nut 241 and the body 215. In particular, the first formation 258 is a multifaceted inner wall of the socket 256, and the second formation 260 is a multifaceted periphery of the lead nut 241. In the illustrated embodiment, the multifaceted inner wall 258 and multifaceted peripheral wall 260 are square in plan view (e.g. as best illustrated in FIG. 14). In alternative embodiments, the multifaceted inner wall 258 and/or multifaceted peripheral wall 260 are of alternative shape (e.g. hexagonal or other polygonal shape in plan view). In alternative embodiments, the first formation 258 and second formation 260 are of a different configuration (e.g. the first formation 258 may include one or more projections from the socket 256 and the second formation 260 may include one or more corresponding recess for receiving the projections, or vice versa).

As best illustrated in FIGS. 11a to 14, the periphery 260 of the lead nut 241 has a plurality of radial recesses 262 (i.e. radial bores) distributed circumferentially around the lead nut 241. The body 215 of the valve member 214 has a plurality of radial channels 264 distributed circumferentially around the body 215 and aligned with the radial recesses 262. A plurality of securing elements 266 are received within the channels 264 of the body 215 and the radial recesses 262 of the lead nut 241 to inhibit movement of the lead nut 241 relative to the body 215. In particular, because the radial recesses 262 are radial bores and the securing elements 266 are a close fit with the radial recesses 262 and radial channels 264, the securing elements 266 inhibit both axial and rotational movement. The securing elements 266 thus act as an additional securing means, which is particularly advantageous in the event that the clamping arrangement 274 is loosened or damaged or the first and second formations 258, 260 are damaged or otherwise not functioning correctly.

In other embodiments, the securing elements may be the primary or only securing means to prevent relative movement between the lead nut and the body 215.

In the illustrated embodiment, the radial recesses 262 are threaded and the securing elements 266 have complementary threads. In alternative embodiments, the radial channels 264 are threaded and the securing elements 266 have complementary threads. In either case, the securing elements 266 are held in place in the radial channels 264 and recesses 262 by engaging the complementary threads.

Figure 17:
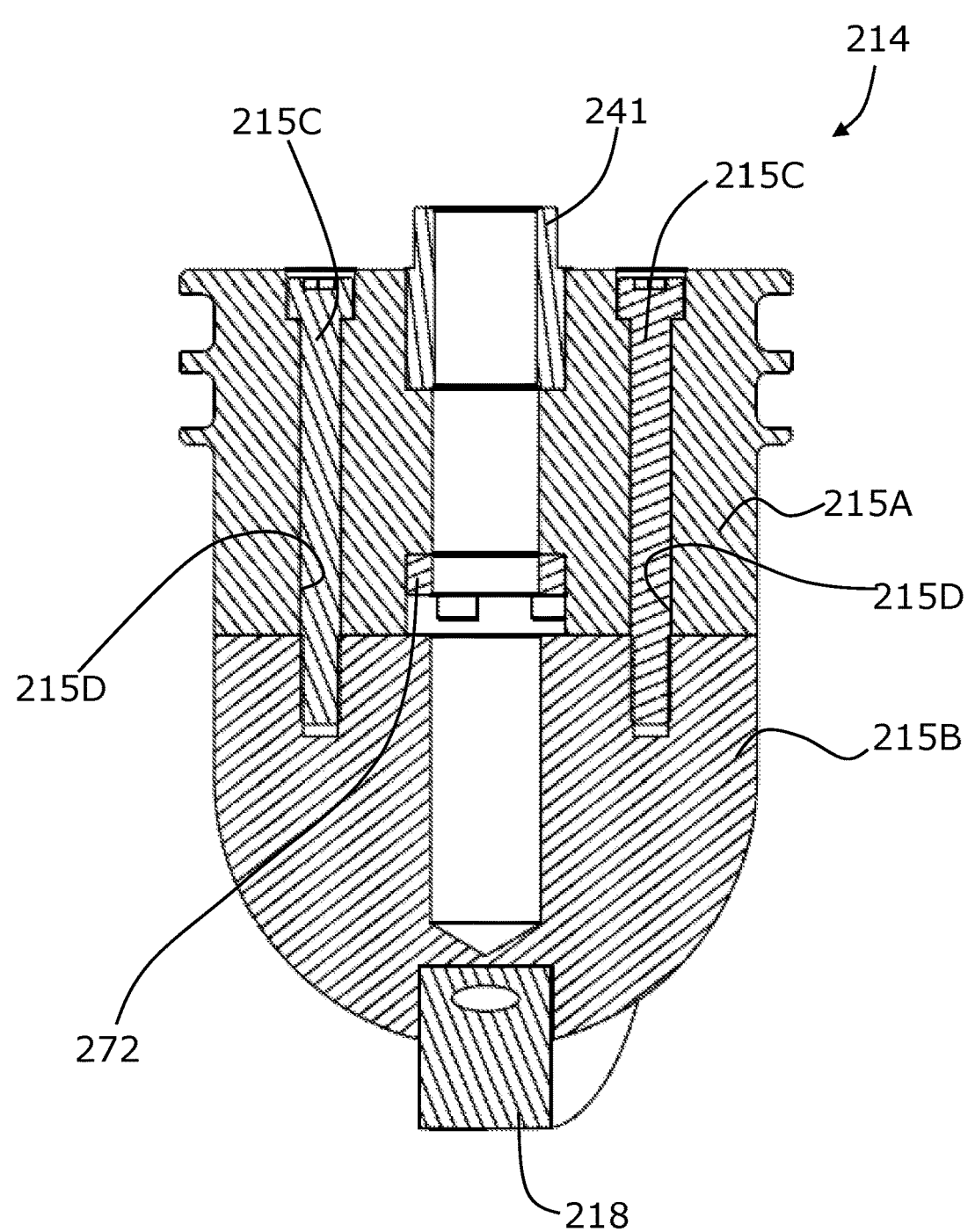
FIG. 17 is a side sectional view of the valve cartridge of FIGS. 9*a* to 15 taken along line E-E.

In alternative embodiments, the radial recesses 262 are grooves and the securing elements 266 can move along the grooves. It will be understood that in such embodiments, the securing elements 266 only inhibit axial movement As best illustrated in FIG. 17, the body 215 has a first body portion 215A releasably coupled to a second body portion 215B. In particular, the first and second body portions are connected to each other via fasteners 215C received within bores 215D within the first and second body portions 215A, 215B.

The first body portion 215A includes the first and second surfaces 268, 270 and the clamping arrangement 274 (as illustrated in FIG. 12). The second surface 270, support element 272 and connecting elements 276 are covered by the second body portion 215B, when assembled (as illustrated in FIGS. 11a and 11b). In this way, the clamping arrangement 274 can be accessed for assembly, repair or maintenance (i.e. the heads 284 of the connecting elements 276 can be turned) when the second body portion 215B is disengaged from the first body portion 215A.

The first body portion 215A is configured to fit within the casing 101 of a valve assembly 100, and the second body portion 215B is interchangeable with other second body portions 215B of different size to fit pipes 102 of different pipe diameters. In this way, the valve cartridge 211 can be reconfigured by replacement of the second body part 215B (and any associated seals, such as gate seal 18) without having to replace the entire valve cartridge 211.

In the illustrated embodiment, the body 215 of the valve member 214 is made of acetal material. In alternative embodiments, the body 215 is made of a different material (e.g. another type of thermoplastics material, or a different type of plastics material). The lead nut is made of a different type of material to the body 215, which is comparatively harder than the material of the body 215. In the illustrated embodiment, the lead nut 241 is made of naval brass or high tensile brass. In some embodiments, the lead nut 241 is made of another material, e.g. another type of brass or another type of metal material.

Figure 13:
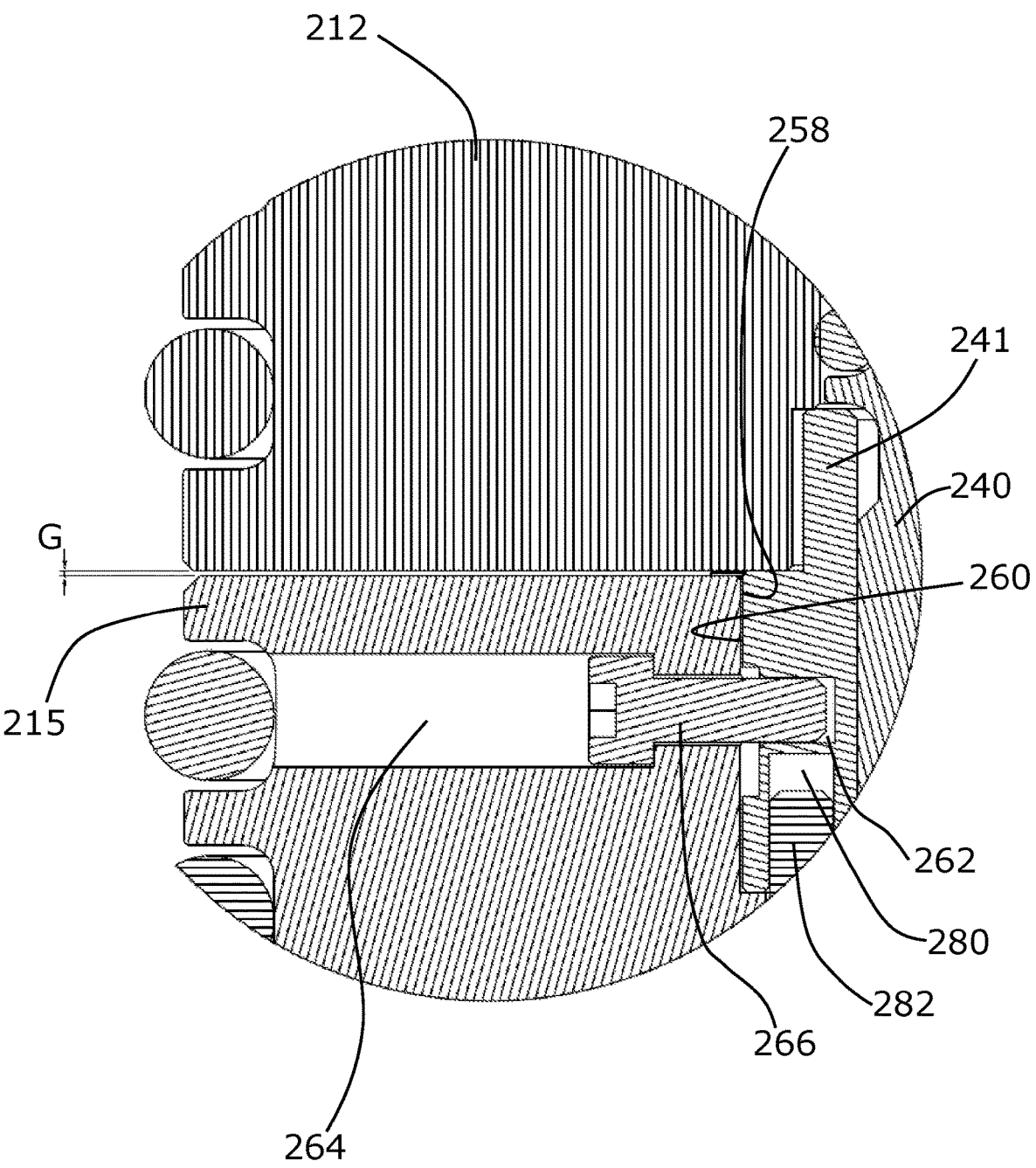
FIG. 13 is an enlarged view of area B of FIG. 11*a* showing the interface between the valve member and fixed portion of the valve cartridge.

As best illustrated in FIG. 13, the lead nut 241 projects axially beyond the valve body 215. In this way, if the leadscrew mechanism 216 is over-actuated when retracting the valve member 214 towards the fixed portion 212, the lead nut 241 contacts the fixed portion 212 before the body 215 does (e.g. see gap G of FIG. 13). Therefore, any abutment force which bears down on top of the valve member 214 is absorbed by the lead nut 241 (which is made of comparatively hard material).

Figure 16:
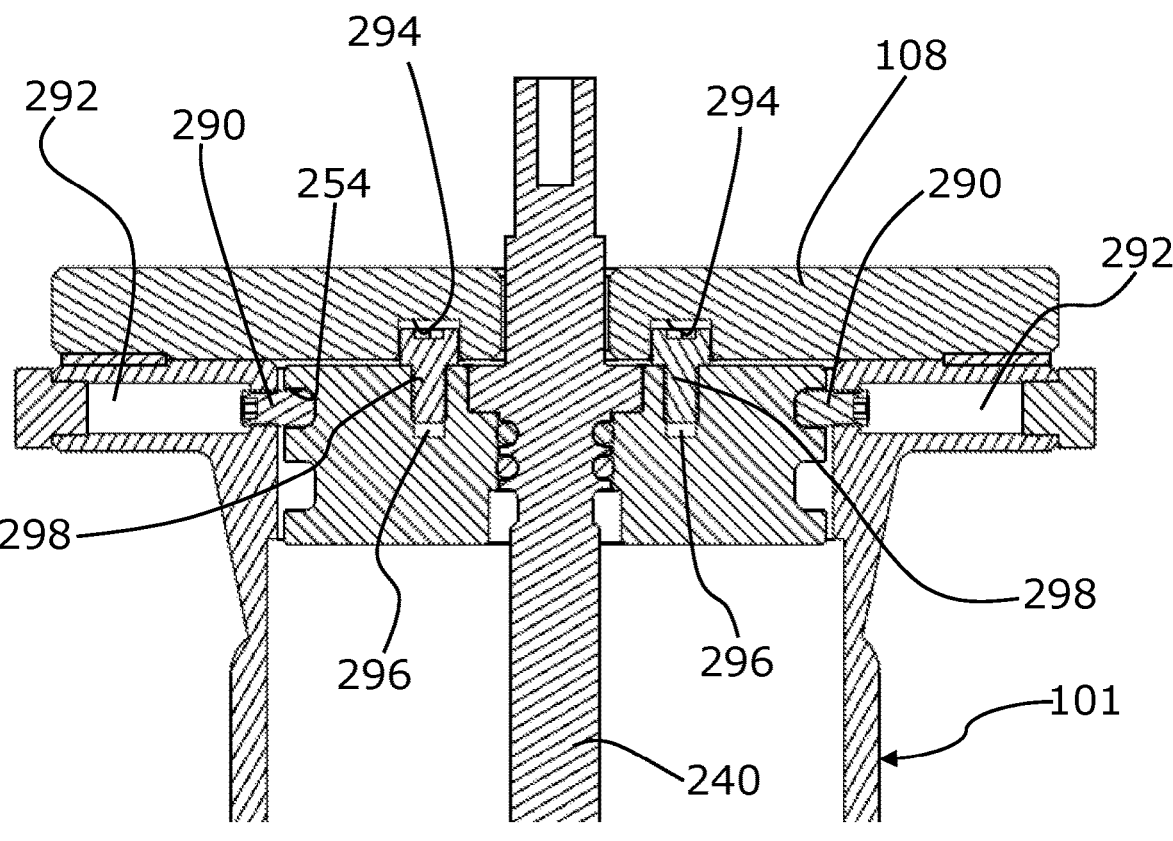
FIG. 16 is a sectional view of the fixed portion of the valve cartridge of FIGS. 9*a* to 15 coupled to a valve casing and cover of a live insertion valve.

Referring now to FIG. 16, the fixed portion 212 has an annular groove 254 for receiving a plurality of securing elements 290 extending from the valve casing 101 to inhibit axial movement of the fixed portion 212 relative to the casing 101. In particular, the securing elements 290 extend through radial channels 292 in the valve casing 101 which are aligned with the annular groove 254. In some embodiments, the securing elements 290 are threadedly engaged in the radial channels 292 to secure them in place.

The cover plate 108 has a plurality of axial bores 294 which are aligned with axial bores 296 in the fixed portion 212 of the valve cartridge 211. Bolts 298 are secured to the axial bores 296 in the fixed portion 212 with the heads of the bolts 298 protruding axially from the fixed portion 212. In other words, the heads of the bolts 298 are axial projections of the fixed portion 212. The heads of the bolts 298 fit within the axial bores 294 of the cover plate 108. In this way, rotation between the fixed portion 212 and the cover plate 108 (and thus between the fixed portion 212 and the valve casing 101) is inhibited.

In alternative embodiments, the annular groove 254 is replaced by a plurality of radial recesses for receiving the plurality of securing elements 290. In such embodiments, the securing elements 290 inhibit both axial and rotational movement of the fixed portion 212 relative to the casing 101.

Figure 19:
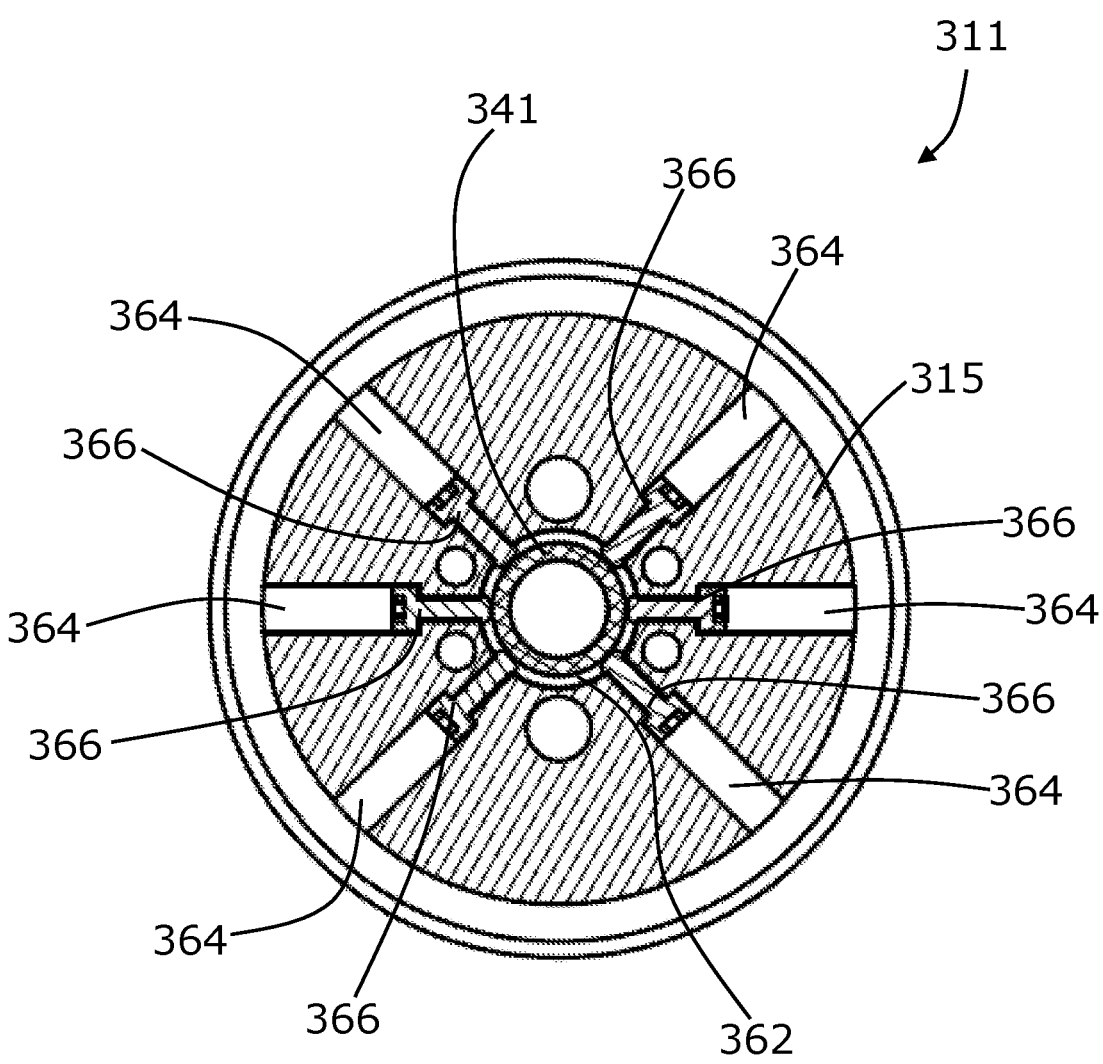
FIG. 19 is a plan sectional view of the valve cartridge of FIG. 18.

Referring now to FIGS. 18 and 19, a valve cartridge according to a further embodiment is indicated at 311. The valve cartridge 311 is configured for use in a live insertion valve assembly of the kind described above in relation to FIGS. 1 to 7. In other words, the valve cartridge 311 can replace the valve cartridge 11 in the valve assembly 100 of FIGS. 1 to 7. Common features between the valve cartridges 11, 211 of FIGS. 1 to 17 and the valve cartridge 311 of this embodiment are given the prefix "3" and only differences between the valve cartridges will be discussed in detail.

In the illustrated embodiment, the lead nut 341 has a threaded periphery 360 which engages a threaded inner wall 358 of the socket 356. The lead nut 341 has an annular groove 362 instead of the radial recesses 262. Similarly to the previous embodiment, the body 315 has radial channels 364 for receiving securing elements 366.

The securing elements 366 inhibit axial movement of the lead nut 341 out of the body 315. Furthermore, because the lead nut 341 is threadedly engaged with the socket 356 of the body 315, and rotational movement between the lead nut 341 and the socket 356 results in axial movement of the lead nut 341 relative to the body 315. Therefore, the securing elements 366, by resisting such an axial movement, also inhibits rotational movement between the lead nut 341 and the socket 356.

In addition, the securing elements 366 may be tightened against the inner wall of the groove to provide a clamping action which further resists rotational movement of the lead nut 341 relative to the body 315.

It will be understood that, during the use of the live insertion valve assemblies described above, the leadscrew 40, 240, 340 may be subjected to downward and/or upward forces. For example, when the valve member 14, 214, 314 is in the inactive state, water flowing along the pipe 102 may form a negative pressure which urges the valve member 14, 214, 314 downwards. When the valve member 14, 214, 314 is urged downwards, the leadscrew 40, 240, 340 is also urged downwards, which urges the flange portion 44, 244, 344 of the leadscrew 40, 240, 340 against the annular seat 46, 246, 346 of the fixed portion 12, 212, 312. This can result in "stiction", making it hard to rotate the leadscrew 40, 240, 340 when it is desired to move the valve member 14, 214, 314 from the inactive state to the active state.

Conversely, when the valve member 14, 214, 314 is moved to the active state, the first seal 18, 218, 318 is compressed against an interior wall of the pipe 102, which causes a reaction force which urges the valve member 14, 214, 314 upwards. When the valve member 14, 214, 314 is urged upwards, the leadscrew 40, 240, 340 is also urged upwards, which urges the flange portion 44, 244, 344 of the leadscrew 40, 240, 340 against the cover plate 108. This can result in "stiction", making it hard to rotate the leadscrew 40, 240, 340 when it is desired to move the valve member 14, 214, 314 from the active state to the inactive state.

Figure 20:
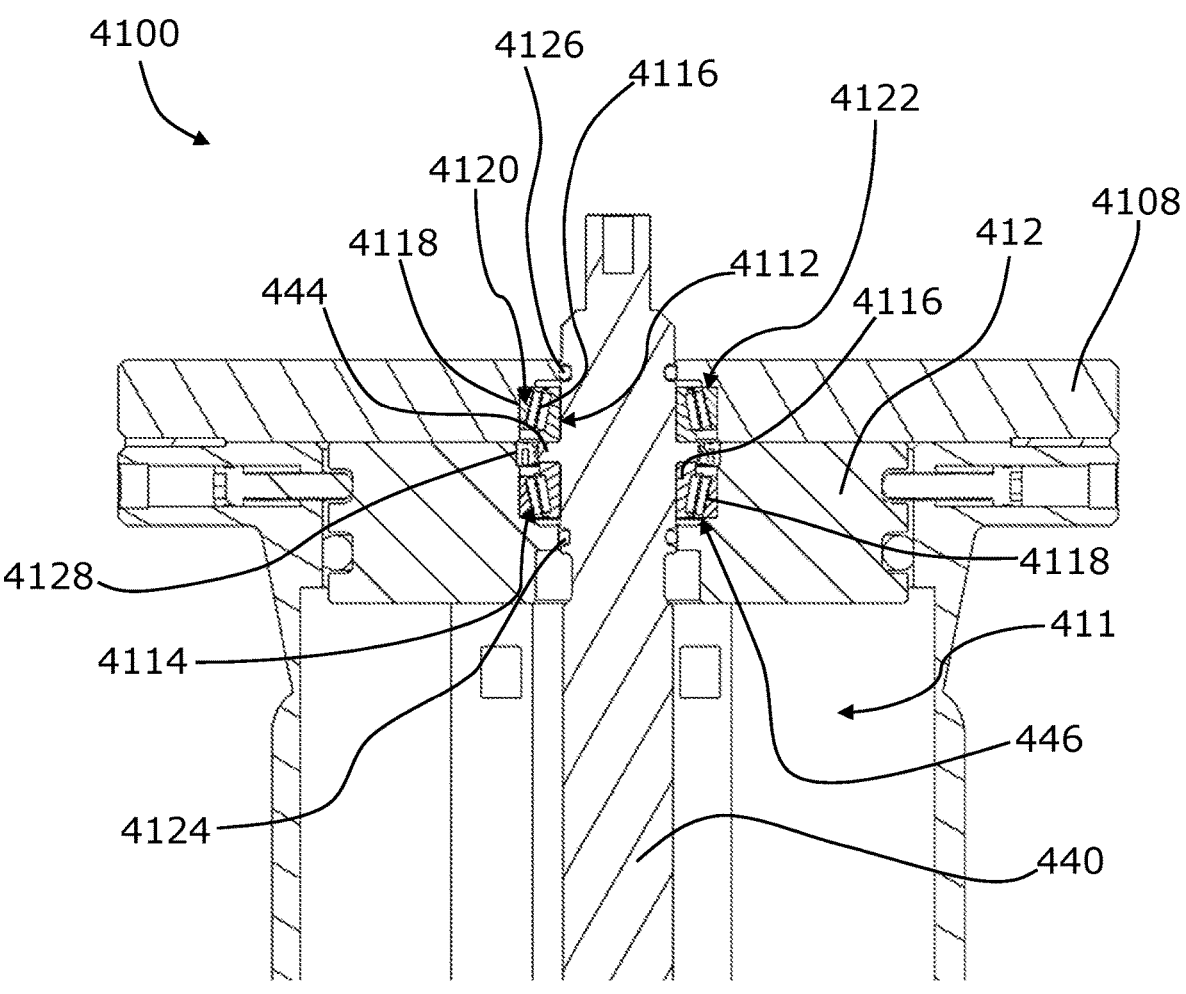
FIG. 20 is a sectional view of an upper portion of a valve assembly according to a further embodiment.

Referring now to FIG. 20, a valve assembly according to an embodiment is indicated at 4100. Features which are common with the previous embodiments of FIGS. 1 to 19 and the valve assembly 4100 of this embodiment are given the prefix "4" and only differences will be discussed in detail. Although the valve member of the valve cartridge 411 is not visible in this embodiment, it will be understood that the valve member of this valve assembly 4100 may be similar or identical to any of the valve members 14, 214, 314 described above, or a different type of valve member of known configuration.

In the embodiment of FIG. 20, the leadscrew 440 is coupled to a thrust bearing arrangement 4112 which is configured to facilitate rotation of the leadscrew 440, e.g. to reduce the amount of force needed to rotate the leadscrew 440. In other words, the thrust bearing arrangement 4112 is configured to overcome the issues outlined above of "stiction" when moving the valve member from the active state to the inactive state and/or vice versa.

In exemplary embodiments, the thrust bearing arrangement 4112 includes at least one thrust bearing located between the leadscrew 440 and the fixed portion 412, and/or at least one thrust bearing located between the leadscrew 440 and the cover plate 4108, and/or at least one thrust bearing located between the leadscrew 440 and any other fixed component of the valve assembly 4100.

In the illustrated embodiment, a first thrust bearing 4114 is provided between the leadscrew 440 and the fixed portion 412 of the valve cartridge 411. The first thrust bearing 4114 has a first bearing component 4116 coupled to the leadscrew 440 and a second bearing component 4118 coupled to the fixed portion 412. The first and second bearing components 4116, 4118 of the first thrust bearing 4114 are configured to rotate relative to each other, which facilitates rotation between the leadscrew 440 and the fixed portion 412 when the leadscrew 440 is subjected to downwards axial force. In other words, the first thrust bearing 4114 reduces stiction caused, for example, by negative pressure urging the valve member coupled to the leadscrew 440 downwards.

Similarly, a second thrust bearing 4120 is provided between the leadscrew 440 and the cover plate 4108. The second thrust bearing 4120 is of a similar configuration to the first thrust bearing 4114. In particular, the second thrust bearing 4120 has a first bearing component 4116 coupled to the leadscrew 440 and a second bearing component 4118 coupled to the cover plate 4108. The first and second bearing components 4116, 4118 of the second thrust bearing 4120 are configured to rotate relative to each other, which facilitates rotation between the leadscrew 440 and the cover plate 4108 when the leadscrew 440 is subjected to upwards axial force. In other words, the second thrust bearing 4120 reduces stiction caused, for example, by a reaction force as the first seal of the valve member is compressed against an interior wall of the pipe.

In the illustrated embodiment, the first bearing components 4116 of the respective first and second thrust bearings 4114, 4120 are coupled to the flange portion 444 of the leadscrew 440. In alternative embodiments, the flange portion 440 is omitted. For example, the first bearing components 4116 may be received within annular grooves in the leadscrew 440.

In the illustrated embodiment, the second bearing component 4118 of the first thrust bearing 4114 is received in the annular seat 446 in the fixed portion 412. Similarly, the second bearing component 4118 of the second thrust bearing 4120 is received within an annular seat 4122 in the cover plate 4108. In alternative embodiments, the second bearing component 4118 of the first thrust bearing 4114 is coupled to a flush surface of the fixed portion 412 and/or the second bearing component 4118 of the second thrust bearing 4120 is coupled to a flush surface of the cover plate 4108. In other words, either of the annular seats 446, 4122 could be omitted if the other annular seat 446, 4122 and/or a spacing between the fixed portion 412 and the cover plate 4108 is resized accordingly.

In the illustrated embodiment, the first and second bearing components 4116, 4118 of the first and second thrust bearings 4114, 4120 consist of angled annular surfaces. It will be understood that this type of thrust bearing 4114, 4120 can inhibit axial movement of the leadscrew 440 in one direction (i.e. when the angled surfaces are moved towards each other), but not in the opposite direction (i.e. when the angled surfaces are moved away from each other). However, because the first thrust bearing 4114 is the opposite way up to the second thrust bearing 4120, the combination of both the first and second thrust bearings 4114, 4120 is able to inhibit axial movement of the leadscrew 440 in both directions, whilst facilitating rotation of the leadscrew 440 under axial force applied from either direction. In other words, the combination of the two opposing thrust bearings 4114, 4120 of this configuration reduces stiction caused by axial forces acting on the leadscrew 440 in either direction.

In alternative embodiments, a single thrust bearing is used. For example, in applications where stiction is predominantly caused by axial forces acting on the leadscrew 440 in one direction, one of the thrust bearings 4114, 4120 may be omitted. Alternatively, a thrust bearing which restricts axial movement of the leadscrew 440 in both directions (e.g. a thrust ball bearing) may be provided instead of the two thrust bearings 4114, 4120 of the illustrated embodiment.

It will be understood that for maximum performance of the thrust bearings 4114, 4120, a lubricant (e.g. grease or oil) can be provided between the first and second bearing components 4116, 4118.

In order to contain any lubricants used, the illustrated thrust bearing arrangement 4112 is sealed by a sealing arrangement 448. In particular, the thrust bearing arrangement 4112 is sealed at a lower end by a fourth seal 4124 located between the leadscrew 440 and the fixed portion 412. This fourth seal 4124 inhibits fluid and/or debris from below the fixed portion 412 from getting into the thrust bearing arrangement 4112, and also inhibits lubricants from leaking downwards out of the thrust bearing arrangement 4112.

The thrust bearing arrangement 4112 is also sealed at an upper end by a fifth seal 4126 located between the leadscrew 440 and the cover plate 4108. The fifth seal 4126 inhibits fluid and/or debris from an external environment (e.g. rain) from getting into the thrust bearing arrangement 4112, and also inhibits lubricants from leaking upwards out of the thrust bearing arrangement 4112.

The thrust bearing arrangement 4112 is also sealed at an interface between the fixed portion 412 and the cover plate 4108 by a sixth seal 4128 located between the leadscrew 440 and the fixed portion 412 and/or cover plate 4108. The sixth seal 4128 inhibits lubricants from leaking out of the thrust bearing arrangement 4112 between the fixed portion 412 and the cover plate 4108.

In the illustrated embodiment, the fourth and fifth seals 4124, 4126 are O-rings (i.e. annular seals with an O-shaped cross-section). The sixth seal 4128 is an annular seal with an approximately U-shaped cross-section. In alternative embodiments, any suitable type of seal may be used for the fourth to sixth seals 4124, 4126, 4128.

It will be understood that the thrust bearing arrangement 4112 illustrated in FIG. 20 is just one suitable arrangement. In alternative embodiments, other suitable types of thrust bearing are used (e.g. thrust ball bearings, thrust roller bearings, fluid thrust bearings, magnetic thrust bearings, etc.).

Although the present disclosure has been described in relation to one or more embodiments, it will be appreciated that various changes or modifications can be made without departing from the scope of the disclosure as defined in the appended claims.

For example, although valve cartridges have been disclosed herein in the context of a live insertion valve, it will be appreciated that the valve cartridges and/or valve members can be used with any suitable valve arrangement;

In alternative embodiments, the actuation mechanism 16 is a ballscrew mechanism, roller screw mechanism or other type of linear actuator mechanism instead of a leadscrew mechanism. It will be understood that in such embodiments the lead nut 241, 341 would be replaced by a ball or roller nut with a different type of axial bore. However, the means for securing the ball or roller nut to the body 215, 315 of the valve member 214, 314 would be the same. In other words, the valve member 214, 314 would still include: the same clamping arrangement 274, 374; and/or radial recesses/grooves 262, 362, radial channels 264, 364 and securing elements 266, 366).

It should also be noted that whilst the appended claims set out particular combinations of features described above, the scope of the present disclosure is not limited to the particular combinations hereafter claimed, but instead extends to encompass each feature herein disclosed in isolation, as well as any combination of features herein disclosed.

It will be understood that the term "radial" used throughout this specification shall be interpreted as approximately perpendicular to the rotational axis of the screw. Similarly, it will be understood that the term "axial" used throughout this specification shall be interpreted as approximately parallel to the rotational axis of the screw.

The invention claimed is:

1. A valve cartridge for a live insertion valve for a pipe, the valve cartridge comprising a valve member, wherein the valve cartridge is configured such that, in use, the valve member is moveable between an inactive state in which the valve member permits a flow of fluid through a pipe, and an active state in which the valve member blocks a flow of fluid through said pipe; wherein the valve member comprises a first seal and a second seal, wherein the valve cartridge is configured such that, in use, the first seal is arranged to block a flow of fluid along said pipe and the second seal is arranged to block a flow of fluid in a direction transverse to said pipe when the valve member is in the active state; wherein the first seal comprises first and second seat portions on opposing sides of the valve member, and the second seal is seated on the first and second seat portions, and wherein:

the second seal comprises a curved cross-sectional profile and each of the first and second seat portions defines a curve or arc in cross-section which conforms to a cross-sectional profile of the second seal, and/or the second seal comprises an annular seal and each of the first and second seat portions is curved in a circumferential direction of the second seal to conform to a circumference of the second seal.

2. The valve cartridge according to claim 1, wherein valve member is configured so that, in use, the first seal is compressible towards the second seal when the valve member is in the active state.

3. The valve cartridge according to claim 1, wherein the first seal is a gate seal which is configured to extend in a first plane such that, when in use, the first plane extends perpendicular to a longitudinal axis of said pipe.

4. The valve cartridge according to claim 1, wherein the valve cartridge comprises an actuation mechanism for moving the valve member such that, in use, the actuation mechanism is configured to move the valve member between the active and inactive states.

5. The valve cartridge according to claim 4, wherein the actuation mechanism is configured to move the valve member linearly such that, in use, the valve member is moveable in a direction transverse to said pipe, in order to move between the active and inactive states.

6. The valve cartridge according to claim 5, further comprising an anti-rotation arrangement configured such that, in use, the anti-rotation arrangement is arranged to inhibit rotation of the valve member relative to said pipe; wherein the anti-rotation arrangement comprises one or more projections.

7. A live insertion valve assembly comprising:

said pipe comprising a side wall having a pipe opening;

a casing comprising a cylindrical channel configured to surround the pipe opening and to extend in a direction transverse to the pipe; and a valve cartridge according to claim 1, wherein the valve cartridge is configured to be at least partially located within the cylindrical channel.

\* \* \* \* \*